United States Patent
Aiiso

(10) Patent No.: US 12,117,589 B2
(45) Date of Patent: Oct. 15, 2024

(54) PLASTIC POLARIZING LENS AND METHOD FOR MANUFACTURING SAME

(71) Applicants: HOPNIC LABORATORY CO., LTD., Sabae (JP); MITSUI CHEMICALS, INC., Tokyo (JP)

(72) Inventor: Yoshimitsu Aiiso, Sabae (JP)

(73) Assignees: HOPNIC LABORATORY CO., LTD., Sabae (JP); MITSUI CHEMICALS, INC., Tokyo (JP)

( * ) Notice: Subject to any disclaimer, the term of this patent is extended or adjusted under 35 U.S.C. 154(b) by 904 days.

(21) Appl. No.: 17/044,365

(22) PCT Filed: Apr. 1, 2019

(86) PCT No.: PCT/JP2019/014482
§ 371 (c)(1),
(2) Date: Oct. 1, 2020

(87) PCT Pub. No.: WO2019/194132
PCT Pub. Date: Oct. 10, 2019

(65) Prior Publication Data
US 2021/0041599 A1 Feb. 11, 2021

(30) Foreign Application Priority Data
Apr. 2, 2018 (JP) ................................ 2018-071183

(51) Int. Cl.
| | | |
|---|---|---|
| *G02B 1/04* | (2006.01) |
| *B29D 11/00* | (2006.01) |
| *C08K 5/3415* | (2006.01) |
| *G02C 7/10* | (2006.01) |
| *G02C 7/12* | (2006.01) |
| *B29K 101/12* | (2006.01) |
| *B29K 105/00* | (2006.01) |

(52) U.S. Cl.
CPC ........ *G02B 1/041* (2013.01); *B29D 11/00644* (2013.01); *C08K 5/3415* (2013.01); *G02C 7/108* (2013.01); *G02C 7/12* (2013.01); *B29K 2101/12* (2013.01); *B29K 2105/0032* (2013.01); *G02C 2202/16* (2013.01)

(58) Field of Classification Search
CPC . G02B 1/04; G02B 1/041; G02C 7/00; G02C 7/02; G02C 7/10; G02C 7/108
See application file for complete search history.

(56) References Cited

U.S. PATENT DOCUMENTS

| | | | |
|---|---|---|---|
| 6,455,163 B1 | 9/2002 | Okamoto et al. | |
| 7,035,010 B2 | 4/2006 | Iori et al. | |
| 7,506,977 B1* | 3/2009 | Aiiso ...................... | C09B 47/04 |
| | | | 351/44 |
| 7,967,434 B2 | 6/2011 | Miura et al. | |
| 8,187,712 B2 | 5/2012 | Ryu et al. | |
| 8,496,859 B2 | 7/2013 | Miura et al. | |
| 9,086,531 B2 | 7/2015 | Ryu et al. | |
| 9,880,402 B2 | 1/2018 | Aiiso et al. | |
| 2002/0136897 A1 | 9/2002 | Okamoto et al. | |
| 2004/0021941 A1 | 2/2004 | Iori et al. | |
| 2007/0058253 A1 | 3/2007 | Aiiso et al. | |
| 2008/0036964 A1 | 2/2008 | Miura et al. | |
| 2009/0201584 A1 | 8/2009 | Ryu et al. | |
| 2011/0215493 A1 | 9/2011 | Miura et al. | |
| 2013/0155507 A1 | 6/2013 | Ryu et al. | |
| 2015/0146165 A1 | 5/2015 | Aiiso et al. | |
| 2015/0276986 A1* | 10/2015 | Ryu ..................... | G02B 5/3033 |
| | | | 359/488.01 |
| 2016/0306195 A1 | 10/2016 | Miyoshi | |
| 2018/0050507 A1 | 2/2018 | Allso et al. | |

FOREIGN PATENT DOCUMENTS

| | | |
|---|---|---|
| JP | H09258009 A | 10/1997 |
| JP | 2001315241 A | 11/2001 |
| JP | 2008134618 A | 6/2008 |
| JP | 2011145341 A | 7/2011 |
| JP | 2015069045 A | 4/2015 |
| JP | 2016206264 A | 12/2016 |
| WO | 2004099859 A1 | 11/2004 |

(Continued)

OTHER PUBLICATIONS

International Search Report (PCT/ISA/210) issued on Jul. 2, 2019, by the Japan Patent Office as the International Searching Authority for International Application No. PCT/JP2019/014482.

(Continued)

*Primary Examiner* — Zachary M Davis
(74) *Attorney, Agent, or Firm* — BUCHANAN, INGERSOLL & ROONEY PC

(57) ABSTRACT

The plastic polarizing lens of the present invention includes a polarizing film comprised of a thermoplastic resin; a first resin substrate composed of at least one layer stacked over a surface of the polarizing film which is located on an object-facing surface side; and a second resin substrate composed of at least one layer stacked over a surface of the polarizing film which is located on an eye-facing surface side, in which an organic colorant compound is included in at least one layer constituting the first resin substrate out of the first resin substrate and the second resin substrate, and the concentration of the organic colorant compound in the first resin substrate is higher than the concentration of the organic colorant compound in the second resin substrate.

20 Claims, No Drawings

(56) References Cited

FOREIGN PATENT DOCUMENTS

| WO | 2008018168 A1 | 2/2008 |
| WO | 2009098886 A1 | 8/2009 |
| WO | 2012020570 A1 | 2/2012 |
| WO | 2016143379 A1 | 9/2016 |

OTHER PUBLICATIONS

Written Opinion (PCT/ISA/237) issued on Jul. 2, 2019, by the Japan Patent Office as the International Searching Authority for International Application No. PCT/JP2019/014482.

* cited by examiner

PLASTIC POLARIZING LENS AND METHOD FOR MANUFACTURING SAME

TECHNICAL FIELD

The present invention relates to a plastic polarizing lens and a method for manufacturing the same.

BACKGROUND ART

Polarizing lenses can prevent the transmission of reflected light. Therefore, they are used for protecting eyes or the like by blocking strong reflected light in outdoors such as in a skiing ground and in fishing, and for securing safety during driving a car by blocking reflected light from a car running in the opposite direction.

Two kinds of plastic polarizing lenses have been proposed, namely, a polarizing lens in which a polarizing film is disposed on the surface of a plastic lens material, and a polarizing lens having a sandwich structure in which a polarizing film is disposed inside a plastic lens material.

Regarding a polarizing lens in which a polarizing film is disposed on the surface of a plastic lens material, the lens described in Patent Document 1 can be mentioned.

Furthermore, Patent Document 2 describes a plastic polarizing lens in which a colored layer is provided on a protective layer of a polarizing film, and a lens base material is further laminated thereon. Patent Document 3 discloses an optical component part including a polarizer sheet on one surface of a resin layer having a light control function.

A polarizing lens having a sandwich structure in which a polarizing film is disposed inside a plastic lens material is described in the following documents.

Patent Documents 4 to 6 disclose plastic polarizing lenses, in each of which a predetermined thiourethane resin layer is laminated on both surfaces of a polarizing film. The document describes that the thiourethane resin layer may contain a dye.

Patent Document 7 describes a plastic spectacle lens formed from a plastic lens wafer formed of a thermosetting resin or a thermoplastic resin, the plastic lens wafer containing a predetermined organic colorant. In this document, it is described that a plastic polarizing lens can be provided.

Patent Document 8 discloses a plastic polarizing lens in which a predetermined thiourethane resin layer is laminated on both surfaces of a polarizing film containing a tetraazaporphyrin compound.

RELATED DOCUMENTS

Patent Documents

[Patent Document 1] JPH9-258009
[Patent Document 2] JP2016-206264
[Patent Document 3] JP2001-315241
[Patent Document 4] WO2008/018168
[Patent Document 5] WO2009/098886
[Patent Document 6] WO2004/099859
[Patent Document 7] JP2008-134618
[Patent Document 8] WO2012/020570

SUMMARY OF THE INVENTION

Technical Problem

However, there is room for improvement in the technology described in the above-mentioned documents from the following viewpoints.

In a polarizing lens having a sandwich structure in which a polarizing film is disposed inside a plastic lens material, it is preferable, from the viewpoint of being easily manufacturable, that a colorant is mixed into a resin composition, and a plastic lens material is prepared from the composition. However, the technologies described in Patent Documents 4 to 8 allow inclusion of a colorant only in the lens base material that is located on the eye-facing surface side of the lens, and in a case in which the lens base material is polished in accordance with a desired dioptric power, a variation occurs in the film thickness, which may cause color unevenness.

Furthermore, with regard to a lens containing a colorant only in the lens base material located on the eye-facing surface side, in a case in which the lens base material is polished, a large amount of the colorant included in this base material is discarded together with the scraped lens base material. Therefore, there is room for improvement in the manufacturing cost. There is also a problem such as the occurrence of color unevenness in the lens base material.

Solution to Problem

The present invention can be described as follows.
[1] A plastic polarizing lens, including:
  a polarizing film comprised of a thermoplastic resin;
  a first resin substrate composed of at least one layer stacked over a surface of the polarizing film which is located on an object-facing surface side; and
  a second resin substrate composed of at least one layer stacked over a surface of the polarizing film which is located on an eye-facing surface side,
  in which an organic colorant compound is included in at least one layer constituting the first resin substrate out of the first resin substrate and the second resin substrate, and a concentration of the organic colorant compound in the first resin substrate is higher than a concentration of the organic colorant compound in the second resin substrate.
[2] The plastic polarizing lens according to [1], in which the second resin substrate does not contain the organic colorant compound.
[3] The plastic polarizing lens according to [1] or [2], in which a minimum thickness (R1-min) and a maximum thickness (R1-max) of the first resin substrate, and a minimum thickness (R2-min) and a maximum thickness (R2-max) of the second resin substrate satisfy the following Expression:

Expression: R1-min/R1-max>R2-min/R2-max

[4] The plastic polarizing lens according to [3], in which the first resin substrate has a substantially uniform thickness.
[5] The plastic polarizing lens according to [3] or [4], in which the minimum thickness (R1-min) of the first resin substrate is smaller than the minimum thickness (R2-min) of the second resin substrate.
[6] The plastic polarizing lens according to any one of [3] to [5], in which the minimum thickness (R1-min) and the maximum thickness (R1-max) of the first resin substrate are 0.1 mm to 4.0 mm, and the minimum thickness (R2-min) and the maximum thickness (R2-max) of the second resin substrate are 0.1 mm to 17.0 mm.
[7] The plastic polarizing lens according to [1], in which in a case in which the organic colorant compound is included in the first resin substrate and the second resin substrate, a ratio (b/a) of a content b of the organic colorant compound in the first resin substrate to a content a of the organic colorant compound in the second resin substrate is 2/1 to 100/1.

[8] The plastic polarizing lens according to any one of [1] to [7], in which the organic colorant compound is a tetraazaporphyrin compound represented by the following General Formula (1):

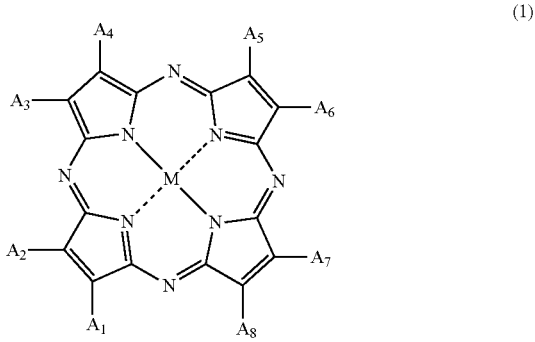

in which in Formula (1), $A_1$ to $A_8$ each independently represent a hydrogen atom, a halogen atom, a nitro group, a cyano group, a hydroxy group, an amino group, a carboxyl group, a sulfonic acid group, a linear, branched, or cyclic alkyl group having 1 to 20 carbon atoms, an alkoxy group having 1 to 20 carbon atoms, an aryloxy group having 6 to 20 carbon atoms, a monoalkylamino group having 1 to 20 carbon atoms, a dialkylamino group having 2 to 20 carbon atoms, a dialkylamino group having 7 to 20 carbon atoms, an aralkyl group having 7 to 20 carbon atoms, an aryl group having 6 to 20 carbon atoms, a heteroaryl group, an alkylthio group having 6 to 20 carbon atoms, or an arylthio group having 6 to 20 carbon atoms, and $A_1$ to $A_8$ may form a ring except for an aromatic ring via a linking group; and M represents two hydrogen atoms, a divalent metal atom, a divalent monosubstituted metal atom, a tetravalent disubstituted metal atom, or an oxy metal atom.

[9] The plastic polarizing lens according to any one of [1] to [8], in which an amount of 5 to 100 ppm of the organic colorant compound is included in the first resin substrate.

[10] The plastic polarizing lens according to any one of [1] to [9], in which layers constituting the first resin substrate and the second resin substrate, which may be identical or different, is comprised of at least one kind selected from a poly(thio)urethane, a polysulfide, a polycarbonate, a poly(meth)acrylate, and a polyolefin.

[11] The plastic polarizing lens according to [10], in which at least one layer constituting the first resin substrate and the second resin substrate is comprised of a poly(thio)urethane.

[12] A method for manufacturing a plastic polarizing lens, the method including:
preparing a first resin substrate containing an organic colorant compound;
preparing a second resin substrate that optionally contain an organic colorant compound at a concentration lower than that of the first resin substrate; and
stacking the first resin substrate to a surface located on an object-facing surface side of a polarizing film comprised of a thermoplastic resin, and also stacking the second resin substrate to a surface located on an eye-facing surface side of the polarizing film.

[13] The method for manufacturing a plastic polarizing lens according to [12], in which layers constituting the first resin substrate and the second resin substrate may be identical or different and include a resin selected from the group consisting of a poly(thio)urethane, a polysulfide, a polycarbonate, a poly(meth)acrylate, and a polyolefin.

[14] A method for manufacturing a plastic polarizing lens, the method including:
separating between a first mold substrate having a forming surface for forming an object-facing surface of a lens and a polarizing film comprised of a thermoplastic resin at a predetermined distance, such that the forming surface and the polarizing film are separated by a first curable composition layer containing an organic colorant compound;
fixing an outer edge of the first mold substrate, an outer edge of the polarizing film, and an outer edge of a second mold substrate having a forming surface for forming an eye-facing surface of the lens, by covering these outer edges with a fixing member, and disposing the second mold substrate so as to face the polarizing film while being separated apart from the polarizing film at a predetermined distance;
injecting a second curable composition that optionally contain an organic colorant compound at a concentration lower than that of a first curable composition, into a gap between the polarizing film and the second mold substrate;
curing the first curable composition layer and the injected second curable composition, thereby forming a first resin substrate and a second resin substrate over both surfaces of the polarizing film;
removing the fixing member, the first mold substrate, and the second mold substrate, and then taking out a plastic lens.

[15] A method for manufacturing a plastic polarizing lens, the method including:
separating between a first mold substrate having a forming surface for forming an object-facing surface of a lens and a polarizing film comprised of a thermoplastic resin at a predetermined distance, such that the forming surface and the polarizing film are separated by a first curable composition layer containing an organic colorant compound;
covering an outer edge of the first mold substrate, an outer edge of the polarizing film, and an outer edge of a second mold substrate having a forming surface for forming an eye-facing surface of the lens, with a fixing member, and thereby disposing the second mold substrate so as to face the polarizing film while being separated apart from the polarizing film at a predetermined distance;
semi-curing the first curable composition layer;
injecting a second curable composition that optionally contain an organic colorant compound at a concentration lower than that of the first curable composition, into a gap between the polarizing film and the second mold substrate;
curing the semi-cured first curable composition layer and the injected second curable composition, thereby forming a first resin substrate and a second resin substrate over both surfaces of the polarizing film;
removing the fixing member, the first mold substrate, and the second mold substrate, and then taking out a plastic lens.

[16] The method for manufacturing a plastic polarizing lens according to [15], in which in the step of semi-curing the first curable composition layer, the first curable composition layer is semi-cured such that the position of the polarizing film is in a state of being immovable at a position separated 0.1 to 3.0 mm apart from the forming surface of the first mold substrate.

[17] A method for manufacturing a plastic polarizing lens, the method including:
separating between a first mold substrate having a forming surface for forming an object-facing surface of a lens and a polarizing film at a predetermined distance, such that the forming surface and the polarizing film are separated by a first curable composition layer containing an organic colorant compound having a viscosity of 1,000 to 100,000 mPa·s;
fixing an outer edge of the first mold substrate, an outer edge of the polarizing film, and an outer edge of a second mold substrate having a forming surface for forming an eye-facing surface of the lens, by covering these outer edges with a fixing member, and disposing the second mold substrate so as to face the polarizing film while being separated apart from the polarizing film at a predetermined distance;
injecting a second curable composition that optionally contain an organic colorant compound at a concentration lower than that of the first curable composition, into a gap between the polarizing film and the second mold substrate;
curing the first curable composition layer and the injected second curable composition, thereby forming a first resin substrate and a second resin substrate over both surfaces of the polarizing film;
removing the fixing member, the first mold substrate, and the second mold substrate, and then taking out a plastic lens.

[18] A method for manufacturing a plastic polarizing lens, the method including:
covering an outer edge of a first mold substrate having a forming surface for forming an object-facing surface of a lens, an outer edge of a polarizing film comprised of a thermoplastic resin, and an outer edge of a second mold substrate having a forming surface for forming an eye-facing surface of a lens, with a fixing member, and thereby fixing the polarizing film in a state of being separated apart from the forming surface of the first mold substrate and the forming surface of the second mold substrate;
injecting a first curable composition containing an organic colorant compound into a gap between the polarizing film and the first mold substrate;
injecting a second curable composition that optionally contain an organic colorant compound at a concentration lower than that of the first curable composition, into a gap between the polarizing film and the second mold substrate;
polymerizing and curing the first curable composition and the second curable composition, thereby forming a first resin substrate and a second resin substrate over both surfaces of the polarizing film;
removing the fixing member, the first mold substrate, and the second mold substrate, and then taking out a plastic polarizing lens.

[19] The method for manufacturing a plastic polarizing lens according to any one of [12] to [18], in which the second resin substrate or the second curable composition does not contain the organic colorant compound.

[20] The method for manufacturing a plastic polarizing lens according to any one of [12] to [19], in which the organic colorant compound is a tetraazaporphyrin compound represented by the following General Formula (1):

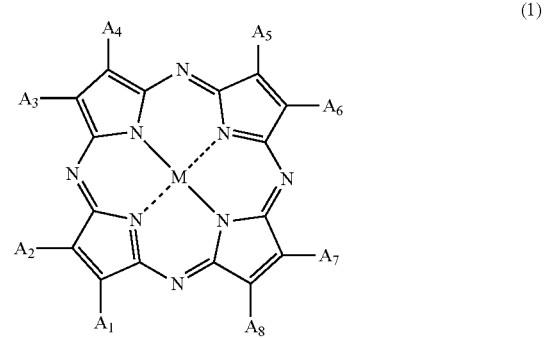

in which in Formula (1), $A_1$ to $A_8$ each independently represent a hydrogen atom, a halogen atom, a nitro group, a cyano group, a hydroxy group, an amino group, a carboxyl group, a sulfonic acid group, a linear, branched, or cyclic alkyl group having 1 to 20 carbon atoms, an alkoxy group having 1 to 20 carbon atoms, an aryloxy group having 6 to 20 carbon atoms, a monoalkylamino group having 1 to 20 carbon atoms, a dialkylamino group having 2 to 20 carbon atoms, a dialkylamino group having 7 to 20 carbon atoms, an aralkyl group having 7 to 20 carbon atoms, an aryl group having 6 to 20 carbon atoms, a heteroaryl group, an alkylthio group having 6 to 20 carbon atoms, or an arylthio group having 6 to 20 carbon atoms, and $A_1$ to $A_8$ may form a ring except for an aromatic ring via a linking group; and M represents two hydrogen atoms, a divalent metal atom, a divalent monosubstituted metal atom, a tetravalent disubstituted metal atom, or an oxy metal atom.

[21] The method for manufacturing a plastic polarizing lens according to any one of [12] to [18], in which in a case in which the organic colorant compound is included in the first resin substrate and the second resin substrate, a ratio (b/a) of a content b of the organic colorant compound in the first resin substrate to a content a of the organic colorant compound in the second resin substrate is 2/1 to 100/1.

[22] The method for manufacturing a plastic polarizing lens according to any one of [12] to [21], in which an amount of 5 to 100 ppm of the organic colorant compound is included in the first resin substrate.

In the present invention, the object-facing surface means the "front surface" as described in JIS 7330, and the eye-facing surface means the "back surface" as described in JIS 7330.

Advantageous Effects of Invention

In the plastic polarizing lens of the present invention, the occurrence of color unevenness of the lens base material is suppressed, the external appearance is excellent, and since it is not necessary to discard the colorant or the amount of the colorant to be discarded can be suppressed to a minimal level, the manufacturing cost can be suppressed.

DESCRIPTION OF EMBODIMENTS

Hereinafter, the plastic polarizing lens of the present invention will be described based on embodiments.

The plastic polarizing lens of the present embodiment includes
  a polarizing film comprised of a thermoplastic resin;
  a first resin substrate composed of at least one layer stacked over a surface of the polarizing film which is located on an object-facing surface side; and
  a second resin substrate composed of at least one layer stacked over a surface of the polarizing film which is located on an eye-facing surface side,
  in which an organic colorant compound is included in at least one layer constituting the first resin substrate out of the first resin substrate and the second resin substrate, and the concentration of the organic colorant compound in the first resin substrate is higher than the concentration of the organic colorant compound in the second resin substrate.

[Polarizing Film]

The polarizing film used for a plastic polarizing lens or the like can be constituted of a thermoplastic resin. Examples of the thermoplastic resin include a thermoplastic polyester, a thermoplastic polycarbonate, a thermoplastic polyolefin, a thermoplastic polyimide, and a thermoplastic polyvinyl-based resin. From the viewpoint of molding processability, a thermoplastic polyvinyl-based resin and a thermoplastic polyester are preferred, and from the viewpoint of water resistance, a thermoplastic polyester is preferred.

Examples of the thermoplastic polyester include polyethylene terephthalate, polyethylene naphthalate, and polybutylene terephthalate, and examples of the thermoplastic polyvinyl-based resin include polyvinyl alcohol.

According to the present embodiment, it is preferable to use polyvinyl alcohol or polyethylene terephthalate easily available and having excellent molding processability.

Specific examples of the polarizing film include a dichroic dye-containing thermoplastic polyester polarizing film, an iodine-containing polyvinyl alcohol polarizing film, a dichroic dye-containing polyvinyl alcohol polarizing film, and a polyvinyl alcohol polarizing film using iodine and a dichroic dye in combination.

The polarizing film may be used after being subjected to a heating treatment for the purpose of drying and stabilization.

Furthermore, the polarizing film may also be used after being subjected to one kind or two or more kinds of pretreatments selected from a primer coating treatment, a chemical treatment (a chemical solution treatment with a gas, an alkali, or the like), a corona discharge treatment, a plasma treatment, an ultraviolet irradiation treatment, an electron beam irradiation treatment, a surface roughening treatment, a flame treatment, and the like, in order to enhance the adhesiveness to the resin constituting the lens base material. Among such pretreatments, one kind or two or more kinds selected from a primer coating treatment, a chemical treatment, a corona discharge treatment, and a plasma treatment are particularly preferred. The polarizing film may be shaped in advance.

[First Resin Substrate]

The first resin substrate is stacked over the surface located on the object-facing surface side of the polarizing film and is composed of one layer or two or more layers. At least one layer constituting the first resin substrate contains an organic colorant compound. In a case in which the first resin substrate has two or more layers, the resins included in the respective layers may be identical or different. The resin layer constituting the first resin substrate located on the object-facing surface side has a substantially uniform layer thickness over the whole resin layer, and therefore, even if an organic colorant compound is included, color unevenness does not occur in the lens base material, while the external appearance is excellent.

The thickness of the first resin substrate is about 0.1 to 4.0 mm, and the thickness of the first resin substrate is substantially uniform over the whole resin substrate.

(Organic Colorant Compound)

Examples of the organic colorant compound include a tetraazaporphyrin compound, a phthalocyanine compound, a porphyrin compound, a merocyanine compound, and a methine compound.

Regarding the tetraazaporphyrin compound, it is preferable to use a compound represented by the following General Formula (1):

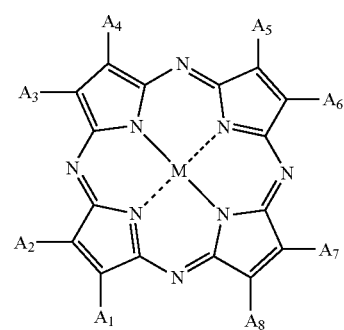

In General Formula (1), $A_1$ to $A_8$ each independently represent a hydrogen atom, a halogen atom, a nitro group, a cyano group, a hydroxy group, an amino group, a carboxyl group, a sulfonic acid group, a linear, branched, or cyclic alkyl group having 1 to 20 carbon atoms, an alkoxy group having 1 to 20 carbon atoms, an aryloxy group having 6 to 20 carbon atoms, a monoalkylamino group having 1 to 20 carbon atoms, a dialkylamino group having 2 to 20 carbon atoms, a dialkylamino group having 7 to 20 carbon atoms, an aralkyl group having 7 to 20 carbon atoms, an aryl group having 6 to 20 carbon atoms, a heteroaryl group, an alkylthio group having 6 to 20 carbon atoms, or an arylthio group having 6 to 20 carbon atoms, and $A_1$ to $A_8$ may form a ring except for an aromatic ring via a linking group; and M represents two hydrogen atoms, a metal atom which may be substituted, or an oxy metal atom. Examples of the metal atom include a copper atom, a nickel atom, and a cobalt atom. Regarding trade names, for example, FDG-004, FDG-005, FDG-006, and FDG-007 manufactured by Yamada Chemical Co., Ltd.; and PD-311S manufactured by Yamamoto Chemicals, Inc. may be mentioned.

For the tetraazaporphyrin compound represented by General Formula (1), it is preferable that M in General Formula (1) is divalent copper. A specific example thereof is a tetra-t-butyltetraazaporphyrin-copper complex represented by the following Formula (1a), which corresponds to the product number of PD-311S (manufactured by Yamamoto Chemicals, Inc.).

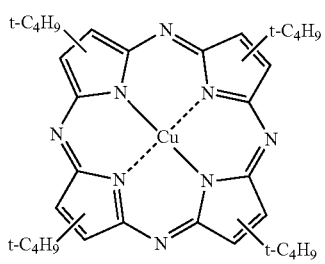

(1a)

In Formula (1a), Cu represents divalent copper; t-C$_4$H$_9$ represents a tertiary-butyl group, and the positions of substitution of the four substituents are either A1 or A2, either A3 or A4, either A5 or A6, and either A7 or A8 in the General Formula (1).

From the viewpoint of the effects of the present invention, the first resin substrate can contain the organic colorant compound in an amount of 5 to 100 ppm, and preferably 7 to 70 ppm.

(Resin)

Regarding the resin, at least one kind selected from a poly(thio)urethane, a polysulfide, a polycarbonate, a poly (meth)acrylate, a polyolefin, a cyclic polyolefin, a polyallyl, a polyurethane urea, a polyene-polythiol polymer, a ring-opened metathesis polymer, a polyester, and an epoxy resin can be used, and at least one kind selected from a poly(thio) urethane, a polysulfide, a polycarbonate, a poly(meth)acrylate, and a polyolefin can be more preferably used. These materials are highly transparent materials and can be suitably used for optical material applications. These materials may be used singly, or composite materials thereof may also be used. The poly(thio)urethane means polyurethane or polythiourethane.

According to the present embodiment, the layer constituting the first resin substrate includes a layer obtained by curing the resin or the first curable compound, and at least one layer thereof contains the organic colorant compound.

A polyurethane is obtained from a polyisocyanate compound and a polyol compound, which are monomers. A polythiourethane is obtained from a polyisocyanate compound and a polythiol compound. The first curable composition may include monomers that constitute these resins.

Examples of the polyisocyanate compound include aliphatic polyisocyanate compounds such as hexamethylene diisocyanate, 2,2,4-trimethylhexane diisocyanate, 2,4,4-trimethylhexamethylene diisocyanate, lysine diisocyanatomethyl ester, lysine triisocyanate, m-xylylene diisocyanate, α,α,α',α'-tetramethylxylylene diisocyanate, bis(isocyanatomethyl) naphthalene, mesitylylene triisocyanate, bis(isocyanatomethyl) sulfide, bis(isocyanatoethyl) sulfide, bis(isocyanatomethyl) disulfide, bis(isocyanatoethyl) disulfide, bis(isocyanatomethylthio)methane, bis(isocyanatoethylthio)methane, bis(isocyanatoethylthio)ethane, and bis(isocyanatomethylthio)ethane; alicyclic polyisocyanate compounds such as isophorone diisocyanate, bis(isocyanatomethyl)cyclohexane, dicyclohexylmethane diisocyanate, cyclohexane diisocyanate, methylcyclohexane diisocyanate, dicyclohexyldimethylmethane isocyanate, 2,5-bis(isocyanatomethyl)bicyclo-[2.2.1]-heptane, 2,6-bis(isocyanatomethyl)bicyclo-[2.2.1]-heptane, 3,8-bis(isocyanatomethyl)tricyclodecane, 3,9-bis(isocyanatomethyl)tricyclodecane, 4,8-bis(isocyanatomethyl)tricyclodecane, and 4,9-bis(isocyanatomethyl)tricyclodecane; aromatic polyisocyanate compounds such as diphenyl sulfide-4,4-diisocyanate and tolylene diisocyanate; and heterocyclic polyisocyanate compounds such as 2,5-diisocyanatothiophene, 2,5-bis(isocyanatomethyl)thiophene, 2,5-diisocyanatotetrahydrothiophene, 2,5-bis(isocyanatomethyl)tetrahydrothiophene, 3,4-bis(isocyanatomethyl)tetrahydrothiophene, 2,5-diisocyanato-1,4-dithiane, 2,5-bis(isocyanatomethyl)-1,4-dithiane, 4,5-diisocyanato-1,3-dithiolane, and 4,5-bis(isocyanatomethyl)-1,3-dithiolane. Regarding the polyisocyanate compound, at least one kind selected from these can be used.

The polyisocyanate compound includes not only a monomer but also the cases of a modified product and/or a mixture with a modified product, and examples of a modified product of isocyanate include an oligomer, a biuret modified product, an allophanate modified product, an oxadiazinetrione modified product, and a polyol modified product. Examples of the oligomer include dimers such as uretdione, uretonimine and carbodiimide; and trimers and higher oligomers such as isocyanurate and iminooxadiandione.

According to the present embodiment, regarding the polyisocyanate compound, it is preferable to use at least one kind selected from m-xylylene diisocyanate, a mixture of 2,5-bis(isocyanatomethyl)-bicyclo[2,2,1]heptane and 2,6-bis(isocyanatomethyl)-bicyclo[2,2,1]-heptane, isophorone diisocyanate, hexamethylene diisocyanate, and tolylene diisocyanate.

The polyol compound is one or more kinds of aliphatic or alicyclic alcohols having two or more hydroxyl groups, and specifically, examples include a linear or branched aliphatic alcohol, an alicyclic alcohol, and alcohols obtained by adding ethylene oxide, propylene oxide, and ε-caprolactone to the above mentioned alcohols.

Examples of the linear or branched aliphatic alcohol include ethylene glycol, diethylene glycol, triethylene glycol, propylene glycol, dipropylene glycol, tripropylene glycol, 1,3-propanediol, 2,2-dimethyl-1,3-propanediol, 2,2-diethyl-1,3-propanediol, 1,2-butanediol, 1,3-butanediol, 1,4-butanediol, 3-methyl-1,3-butanediol, 1,2-pentanediol, 1,3-pentanediol, 1,5-pentanediol, 2,4-pentanediol, 2-methyl-2,4-pentanediol, 3-methyl-1,5-pentanediol, 1,6-hexanediol, 2,5-hexanediol, glycerol, diglycerol, polyglycerol, trimethylolpropane, pentaerythritol, di(trimethylolpropane), and trimethylolpropane propoxylate. Regarding the linear or branched aliphatic alcohol, at least one kind selected from these can be used.

Examples of the alicyclic alcohol include 1,2-cyclopentanediol, 1,3-cyclopentanediol, 3-methyl-1,2-cyclopentanediol, 1,2-cyclohexanediol, 1,3-cyclohexanediol, 1,4-cyclohexanediol, 4,4'-bicyclohexanol, and 1,4-cyclohexanedimethanol. Regarding the alicyclic alcohol, at least one kind selected from these can be used.

Compounds obtained by adding ethylene oxide, propylene oxide or ε-caprolactone to these alcohols may also be used. Examples include an ethylene oxide adduct of glycerol, an ethylene oxide adduct of trimethylolpropane, an ethylene oxide adduct of pentaerythritol, a propylene oxide adduct of glycerol, a propylene oxide adduct of trimethylolpropane, a propylene oxide adduct of pentaerythritol, caprolactone-modified glycerol, caprolactone-modified trimethylolpropane, and caprolactone-modified pentaerythritol. Regarding the adduct, at least one kind selected from these can be used.

According to the present embodiment, it is preferable to use trimethylolpropane propoxylate as the polyol compound.

Examples of the polythiol compound include aliphatic polythiol compounds such as methanedithiol, 1,2-ethanedithiol, 1,2,3-propanetrithiol, 1,2-cyclohexanedithiol, bis(2-mercaptoethyl) ether, tetrakis(mercaptomethyl)methane, diethylene glycol bis(2-mercaptoacetate), diethylene glycol bis(3-mercaptopropionate), ethylene glycol bis(2-mercaptoacetate), ethylene glycol bis(3-mercaptopropionate), trimethylolpropane tris(2-mercaptoacetate), trimethylolpropane tris(3-mercaptopropionate), trimethylolethane tris(2-mercaptoacetate), trimethylolethane tris(3-mercaptopropionate), pentaerythritol tetrakis(2-mercaptoacetate), pentaerythritol tetrakis(3-mercaptopropionate), bis(mercaptomethyl) sulfide, bis(mercaptomethyl) disulfide, bis(mercaptoethyl) sulfide, bis(mercaptoethyl) disulfide, bis(mercaptopropyl) sulfide, bis(mercaptomethylthio)methane, bis(2-mercaptoethylthio)methane, bis(3-mercaptopropylthio)methane, 1,2-bis(mercaptomethylthio)ethane, 1,2-bis(2-mercaptoethylthio)ethane, 1,2-bis(3-mercaptopropylthio)ethane, 1,2,3-tris(mercaptomethylthio)propane, 1,2,3-tris(2-mercaptoethylthio)propane, 1,2,3-tris(3-mercaptopropylthio)propane, 4-mercaptomethyl-1,8-dimercapto-3,6-dithiaoctane, 5,7-dimercaptomethyl-1,11-dimercapto-3,6,9-trithiaundecane, 4,7-dimercaptomethyl-1,11-dimercapto-3,6,9-trithiaundecane, 4,8-dimercaptomethyl-1,11-dimercapto-3,6,9-trithiaundecane, tetrakis(mercaptomethylthiomethyl)methane, tetrakis(2-mercaptoethylthiomethyl)methane, tetrakis(3-mercaptopropylthiomethyl)methane, bis(2,3-dimercaptopropyl) sulfide, 2,5-dimercaptomethyl-1,4-dithiane, 2,5-dimercapto-1,4-dithiane, 2,5-dimercaptomethyl-2,5-dimethyl-1,4-dithiane, esters of these thioglycolic acids and mercaptopropionic acids, hydroxymethyl sulfide bis(2-mercaptoacetate), hydroxymethyl sulfide bis(3-mercaptopropionate), hydroxyethyl sulfide bis(2-mercaptoacetate), hydroxyethyl sulfide bis(3-mercaptopropionate), hydroxymethyl disulfide bis(2-mercaptoacetate), hydroxymethyl disulfide bis(3-mercaptopropionate), hydroxyethyl disulfide bis(2-mercaptoacetate), hydroxyethyl disulfide bis(3-mercaptopropionate), 2-mercaptoethyl ether bis(2-mercaptoacetate), 2-mercaptoethyl ether bis(3-mercaptopropionate), thiodiglycolic acid bis(2-mercaptoethyl ester), thiodipropionic acid bis(2-mercaptoethyl ester), dithiodiglycolic acid bis(2-mercaptoethyl ester), dithiodipropionic acid bis(2-mercaptoethyl ester), 1,1,3,3-tetrakis(mercaptomethylthio)propane, 1,1,2,2-tetrakis(mercaptomethylthio)ethane, 4,6-bis(mercaptomethylthio)-1,3-dithiane, tris(mercaptomethylthio)methane, tris(mercaptoethylthio)methane, and 1,2-bis[(2-mercaptoethyl)thio]-3-mercaptopropane; aromatic polythiol compounds such as 1,2-dimercaptobenzene, 1,3-dimercaptobenzene, 1,4-dimercaptobenzene, 1,2-bis(mercaptomethyl)benzene, 1,3-bis(mercaptomethyl)benzene, 1,4-bis(mercaptomethyl)benzene, 1,2-bis(mercaptoethyl)benzene, 1,3-bis(mercaptoethyl)benzene, 1,4-bis(mercaptoethyl)benzene, 1,3,5-trimercaptobenzene, 1,3,5-tris(mercaptomethyl)benzene, 1,3,5-tris(mercaptomethyleneoxy)benzene, 1,3,5-tris(mercaptoethyleneoxy)benzene, 2,5-toluenedithiol, 3,4-toluenedithiol, 1,5-naphthalenedithiol, and 2,6-naphthalenedithiol; and heterocyclic polythiol compounds such as 2-methylamino-4,6-dithiol-sym-triazine, 3,4-thiophenedithiol, bismuthiol, 4,6-bis(mercaptomethylthio)-1,3-dithiane, and 2-(2,2-bis(mercaptomethylthio)ethyl)-1,3-dithietane. Regarding the polythiol compound, at least one kind selected from these can be used.

A thiol compound having a hydroxyl group can also be used. Examples of the thiol compound having a hydroxyl group include 2-mercaptoethanol, 3-mercapto-1,2-propanediol, glycerin bis(mercaptoacetate), 4-mercaptophenol, 2,3-dimercapto-1-propanol, pentaerythritol tris(3-mercaptopropionate), and pentaerythritol tris(thioglycolate). Regarding the thiol compound having a hydroxyl group, at least one kind selected from these can be used.

According to the present embodiment, regarding the polythiol compound, it is preferable to use at least one kind selected from pentaerythritol tetrakis(3-mercaptopropionate), 1,2-bis[(2-mercaptoethyl)thio]-3-mercaptopropane, and a mixture of 5,7-dimercaptomethyl-1,11-dimercapto-3,6,9-trithiaundecane, 4,7-dimercaptomethyl-1,11-dimercapto-3,6,9-trithiaundecane, and 4,8-dimercaptomethyl-1,11-dimercapto-3,6,9-trithiaundecane.

A polysulfide can be obtained by a method based on ring-opening polymerization of a polyepithio compound or a polythietane compound, both of which are monomers. The first curable composition may include monomers that constitute these resins.

Examples of the polyepithio compound include epithioethylthio compounds such as bis(1,2-epithioethyl) sulfide, bis(1,2-epithioethyl) disulfide, bis(epithioethylthio)methane, bis(epithioethylthio)benzene, bis[4-(epithioethylthio)phenyl] sulfide, and bis[4-(epithioethylthio)phenyl]methane; chain aliphatic 2,3-epithiopropylthio compounds such as bis(2,3-epithiopropyl) sulfide, bis(2,3-epithiopropyl) disulfide, bis(2,3-epithiopropylthio)methane, 1,2-bis(2,3-epithiopropylthio)ethane, 1,2-bis(2,3-epithiopropylthio)propane, 1,3-bis(2,3-epithiopropylthio)propane, 1,3-bis(2,3-epithiopropylthio)-2-methylpropane, 1,4-bis(2,3-epithiopropylthio)butane, 1,4-bis(2,3-epithiopropylthio)-2-methylbutane, 1,3-bis(2,3-epithiopropylthio)butane, 1,5-bis(2,3-epithiopropylthio)pentane, 1,5-bis(2,3-epithiopropylthio)-2-methylpentane, 1,5-bis (2,3-epithiopropylthio)-3-thiapentane, 1,6-bis(2,3-epithiopropylthio)hexane, 1,6-bis(2,3-epithiopropylthio)-2-methylhexane, 1,8-bis(2,3-epithiopropylthio)-3,6-dithiaoctane, 1,2,3-tris(2,3-epithiopropylthio)propane, 2,2-bis(2,3-epithiopropylthio)-1,3-bis(2,3-epithiopropylthiomethyl)propane, 2,2-bis(2,3-epithiopropylthiomethyl)-1-(2,3-epithiopropylthio)butane, 1,5-bis(2,3-epithiopropylthio)-2-(2,3-epithiopropylthiomethyl)-3-thiapentane, 1,5-bis (2,3-epithiopropylthio)-2,4-bis(2,3-epithiopropylthiomethyl)-3-thiapentane, 1-(2,3-epithiopropylthio)-2,2-bis(2,3-epithiopropylthiomethyl)-4-thiahexane, 1,5,6-tris(2,3-epithiopropylthio)-4-(2,3-epithiopropylthiomethyl-3-thiahexane, 1,8-bis(2,3-epithiopropylthio)-4-(2,3-epithiopropylthiomethyl)-3,6-dithiaoctane, 1,8-bis(2,3-epithiopropylthio)-4,5-bis(2,3-epithiopropylthiomethyl)-3,6-dithiaoctane, 1,8-bis(2,3-epithiopropylthio)-4,4-bis(2,3-epithiopropylthiomethyl)-3,6-dithiaoctane, 1,8-bis(2,3-epithiopropylthio)-2,5-bis(2,3-epithiopropylthiomethyl)-3,6-dithiaoctane, 1,8-bis(2,3-epithiopropylthio)-2,4,5-tris(2,3-epithiopropylthiomethyl)-3,6-dithiaoctane, 1,1,1-tris[[2-(2,3-epithiopropylthio)ethyl]thiomethyl]-2-(2,3-epithiopropylthio)ethane, 1,1,2,2-tetrakis[[2-(2,3-epithiopropylthio)ethyl]thiomethyl]ethane, 1,11-bis(2,3-epithiopropylthio)-4,8-bis(2,3-epithiopropylthiomethyl)-3,6,9-trithiaundecane, 1,11-bis(2,3-epithiopropylthio)-4,7-bis(2,3-epithiopropylthiomethyl)-3,6,9-trithiaundecane, and 1,11-bis(2,3-epithiopropylthio)-5,7-bis(2,3-epithiopropylthiomethyl)-3,6,9-trithiaundecane; cycloaliphatic 2,3-epithiopropylthio compounds such as 1,3-bis(2,3-epithiopropylthio)cyclohexane, 1,4-bis(2,3-epithiopropylthio)cyclohexane, 1,3-bis(2,3-epithiopropylthiomethyl)cyclohexane, 1,4-bis(2,3-epithiopropylthiomethyl)cyclohexane, 2,5-bis(2,3-epithiopropylthiomethyl)-1,4-dithiane, 2,5-bis[[2-(2,3-epithiopropylthio)ethyl]thiomethyl]-1,4-dithiane, and 2,5-bis(2,3-epithiopropylthiomethyl)-2,5-dimethyl-1,4-dithiane;

aromatic 2,3-epithiopropylthio compounds such as 1,2-bis(2,3-epithiopropylthio)benzene, 1,3-bis(2,3-epithiopropylthio)benzene, 1,4-bis(2,3-epithiopropylthio)benzene, 1,2-bis(2,3-epithiopropylthiomethyl)benzene, 1,3-bis(2,3-epithiopropylthiomethyl)benzene, 1,4-bis(2,3-epithiopropylthiomethyl)benzene, bis[4-(2,3-epithiopropylthio)phenyl]methane, 2,2-bis[4-(2,3-epithiopropylthio)phenyl]propane, bis[4-(2,3-epithiopropylthio)phenyl] sulfide, bis[4-(2,3-epithiopropylthio)phenyl]sulfone, and 4,4'-bis(2,3-epithiopropylthio)biphenyl; chain aliphatic 2,3-epithiopropyloxy compounds such as bis(2,3-epithiopropyl) ether, bis (2,3-epithiopropyloxy)methane, 1,2-bis(2,3-epithiopropyloxy)ethane, 1,2-bis(2,3-epithiopropyloxy)propane, 1,3-bis(2,3-epithiopropyloxy)propane, 1,3-bis(2,3-epithiopropyloxy)-2-methylpropane, 1,4-bis(2,3-epithiopropyloxy)butane, 1,4-bis(2,3-epithiopropyloxy)-2-methylbutane, 1,3-bis(2,3-epithiopropyloxy)butane, 1,5-bis(2,3-epithiopropyloxy)pentane, 1,5-bis(2,3-epithiopropyloxy)-2-methylpentane, 1,5-bis(2,3-epithiopropyloxy)-3-thiapentane, 1,6-bis(2,3-epithiopropyloxy)hexane, 1,6-bis(2,3-epithiopropyloxy)-2-methylhexane, 1,8-bis(2,3-epithiopropyloxy)-3,6-dithiaoctane, 1,2,3-tris(2,3-epithiopropyloxy)propane, 2,2-bis(2,3-epithiopropyloxy)-1,3-bis(2,3-epithiopropyloxymethyl) propane, 2,2-bis(2,3-epithiopropyloxymethyl)-1-(2,3-epithiopropyloxy)butane, 1,5-bis(2,3-epithiopropyloxy)-2-(2,3-epithiopropyloxymethyl)-3-thiapentane, 1,5-bis(2,3-epithiopropyloxy)-2,4-bis (2,3-epithiopropyloxymethyl-3-thiapentane, 1-(2,3-epithiopropyloxy)-2,2-bis(2,3-epithiopropyloxymethyl)-4-thiahexane, 1,5,6-tris(2,3-epithiopropyloxy)-4-(2,3-epithiopropyloxymethyl)-3-thiahexane, 1,8-bis(2,3-epithiopropyloxy)-4-(2,3-epithiopropyloxymethyl)-3,6-dithiaoctane, 1,8-bis(2,3-epithiopropyloxy)-4,5-bis(2,3-epithiopropyloxymethyl)-3,6-dithiaoctane, 1,8-bis(2,3-epithiopropyloxy)-4,4-bis(2,3-epithiopropyloxymethyl)-3,6-dithiaoctane, 1,8-bis(2,3-epithiopropyloxy)-2,5-bis(2,3-epithiopropyloxymethyl)-3,6-dithiaoctane, 1,8-bis(2,3-epithiopropyloxy)-2,4,5-tris(2,3-epithiopropyloxymethyl)-3,6-dithiaoctane, 1,1,1-tris[[2-(2,3-epithiopropyloxy)ethyl]thiomethyl]-2-(2,3-epithiopropyloxy)ethane, 1,1,2,2-tetrakis[[2-(2,3-epithiopropyloxy)ethyl]thiomethyl]ethane, 1,11-bis(2,3-epithiopropyloxy)-4,8-bis(2,3-epithiopropyloxymethyl)-3,6,9-trithiaundecane, 1,11-bis(2,3-epithiopropyloxy)-4,7-bis(2,3-epithiopropyloxymethyl)-3,6,9-trithiaundecane, and 1,11-bis(2,3-epithiopropyloxy)-5,7-bis(2,3-epithiopropyloxymethyl)-3,6,9-trithiaundecane; cycloaliphatic 2,3-epithiopropyloxy compounds such as 1,3-bis(2,3-epithiopropyloxy)cyclohexane, 1,4-bis(2,3-epithiopropyloxy)cyclohexane, 1,3-bis(2,3-epithiopropyloxymethyl)cyclohexane, 1,4-bis(2,3-epithiopropyloxymethyl)cyclohexane, 2,5-bis(2,3-epithiopropyloxymethyl)-1,4-dithiane, 2,5-bis[[2-(2,3-epithiopropyloxy)ethyl]thiomethyl]-1,4-dithiane, and 2,5-bis(2,3-epithiopropyloxymethyl)-2,5-dimethyl-1,4-dithiane; and aromatic 2,3-epithiopropyloxy compounds such as 1,2-bis(2,3-epithiopropyloxy)benzene, 1,3-bis(2,3-epithiopropyloxy)benzene, 1,4-bis(2,3-epithiopropyloxy)benzene, 1,2-bis(2,3-epithiopropyloxymethyl)benzene, 1,3-bis(2,3-epithiopropyloxymethyl)benzene, 1,4-bis(2,3-epithiopropyloxymethyl)benzene, bis[4-(2,3-epithiopropyloxy)phenyl]methane, 2,2-bis[4-(2,3-epithiopropyloxy)phenyl]propane, bis[4-(2,3-epithiopropyloxy)phenyl] sulfide, bis[4-(2,3-epithiopropyloxy)phenyl]sulfone, and 4,4'-bis(2,3-epithiopropyloxy)biphenyl. Regarding the polyepithio compound, at least one kind selected from these can be used.

According to the present embodiment, it is preferable to use bis(2,3-epithiopropyl) disulfide as the polyepithio compound.

Regarding the polythietane compound, a metal-containing thietane compound or a non-metal thietane compound can be used.

These polythietane compounds contain one or more thietanyl groups in the molecule, as disclosed in WO 2005/95490 and Japanese Unexamined Patent Application Publication No. 2003-327583. Preferred is a compound containing two or more thietanyl groups in total. Examples include sulfide-based thietane compounds such as bisthietanyl sulfide, bis (3-thietanylthio) disulfide, bis (3-thietanylthio)methane, and 3-(((3'-thietanylthio) methylthio) methylthio) thietane; and polysulfide-based thietane compounds such as bis (3-thietanyl) disulfide, bis (3-thietanyl) trisulfide, bis (3-thietanyl) tetrasulfide, and bis (3-thietanyl) pentasulfide. Regarding the polythietane compound, at least one kind selected from these can be used.

A polycarbonate can be obtained by a method of reacting an alcohol with phosgene or reacting an alcohol with chloroformate, or by performing a transesterification reaction of a carbonic acid diester compound; however, it is also possible to use a commercially available product polycarbonate resin that can be commonly purchased. Regarding a commercially available product, PANLITE series manufactured by Teijin Chemicals, Ltd. and the like can be used. The first curable composition of the present embodiment can include a polycarbonate as a resin.

Regarding the poly(meth)acrylate, poly(meth)acrylates of alkane polyols, such as ethylene glycol di(meth)acrylate, propylene glycol di(meth)acrylate, butylene glycol di(meth)acrylate, neopentyl glycol di(meth)acrylate, hexylene glycol di(meth)acrylate, trimethylolpropane tri(meth)acrylate, and pentaerythritol tetra(meth)acrylate; polyoxyalkane polyol poly(meth)acrylates such as diethylene glycol di(meth)acrylate, triethylene glycol di(meth)acrylate, polyethylene glycol di(meth)acrylate, dipropylene glycol di(meth)acrylate, polypropylene glycol di(meth)acrylate, dibutylene glycol di(meth)acrylate, and dipentaerythritol hexa(meth)acrylate; and the like can be mentioned. Regarding the poly(meth)acrylate, at least one kind selected from these can be used.

The first curable composition of the present embodiment can include a poly(meth)acrylate as a resin.

A polyolefin is produced by polymerizing at least one olefin selected from α-olefins in the presence of a known catalyst for olefin polymerization such as a Ziegler-Natta catalyst, a metallocene catalyst, or a so-called post-metallocene catalyst. The α-olefin monomer may be a single component, or composite components may be copolymerized.

The olefin polymerization reaction in the production of a polyolefin can be carried out by a liquid phase polymerization method such as solution polymerization, suspension polymerization, or bulk polymerization method; a gas phase polymerization method; or any other known polymerization method. Preferably, a liquid phase polymerization method such as solution polymerization or suspension polymerization (slurry polymerization) is used for the production of a polyolefin, and more preferably, suspension polymerization (slurry polymerization) method is used. Regarding the polymerization temperature and pressure conditions, known conditions can be applied.

The first curable composition of the present embodiment can include a polyolefin as a resin.

The cyclic polyolefin is produced by polymerizing at least one cyclic olefin selected from cyclic olefins in the presence of a known olefin polymerization catalyst. The cyclic olefin monomer may be a single component, or composite components may be copolymerized. Regarding the cyclic polyolefin, APEL (trademark) manufactured by Mitsui Chemicals, Inc. has high transparency and can be suitably used.

A polyallyl is produced by polymerizing at least one allyl group-containing monomer selected from allyl group-containing monomers in the presence of a known radical-generating polymerization catalyst. Regarding the allyl group-containing monomer, allyl diglycol carbonate and diallyl phthalate are generally commercially available, and these can be suitably used.

A polyurethane urea is a reaction product of a polyurethane prepolymer and a diamine curing agent, and a representative example thereof is sold under the trademark TRIVEX by PPG Industries, Inc. A polyurethane urea is a highly transparent material and can be suitably used.

A polyene-polythiol polymer is a macromolecule product obtained by addition polymerization and ethylene chain polymerization of a polyene compound having two or more ethylenic functional groups in one molecule and a polythiol compound having two or more thiol groups in one molecule.

Examples of the polyene compound for the polyene-polythiol polymer include an allyl alcohol derivative, an ester of (meth)acrylic acid and a polyhydric alcohol, urethane acrylate, and divinylbenzene. One kind or two or more kinds of thereof can be used.

Examples of the allyl alcohol derivative include triallyl isocyanurate, triallyl cyanurate, diallyl maleate, diallyl fumarate, diallyl adipate, diallyl phthalate, triallyl trimellitate, tetraallyl pyromellitate, glycerin diallyl ether, trimethylolpropane diallyl ether, pentaerythritol diallyl ether, and sorbitol diallyl ether. Regarding the polyene compound, at least one kind selected from these can be used.

In the ester of (meth)acrylic acid and a polyhydric alcohol, examples of the polyhydric alcohol include ethylene glycol, propylene glycol, 1,4-butanediol, 1,6-hexanediol, glycerin, trimethylolpropane, pentaerythritol, and sorbitol.

A ring-opening metathesis polymer is a polymer obtained by subjecting a cyclic olefin to ring-opening polymerization using a catalyst. The cyclic olefin that can be subjected to ring-opening polymerization is not particularly limited as long as it is an olefin having a cyclic structure; however, usually, a monocyclic cycloalkene having 3 to 40 carbon atoms, a monocyclic cycloalkadiene, a polycyclic cycloalkene, and a polycyclic cycloalkadiene may be mentioned. Specific examples of the monocyclic cycloalkene include cyclobutene, cyclopentene, cyclohexene, and cyclooctene. Specific examples of the monocyclic cycloalkadiene include cyclobutadiene, 1,3-cyclopentadiene, 1,3-cyclohexadiene, 1,4-cyclohexadiene, and 1,5-cyclooctadiene. Examples of the polycyclic cycloalkene include norbornene and tetracyclo[6.2.1.1$^{3,6}$.0$^{2,7}$]dodeca-4-ene. Examples of polycyclic cycloalkadiene include norbornadiene and dicyclopentadiene. These may be substituted with oxygen, sulfur, halogen, or the like. These may also be used after being further hydrogenated. For example, ARTON (trademark) of JSR Corporation can be mentioned as a suitable example.

A polyester is subjected to condensation polymerization in the presence of a Lewis acid catalyst typified by antimony and germanium compounds, or a known polyester production catalyst such as an organic acid or an inorganic acid. Specifically, a polyester refers to a polymer formed from one kind or two or more kinds selected from polyvalent carboxylic acids including dicarboxylic acids and ester-forming derivatives thereof as well as one kind or two or more kinds selected from polyhydric alcohols including glycols; a polymer formed from a hydroxycarboxylic acid and ester-forming derivatives thereof; or a polymer formed from a cyclic ester.

Examples of the dicarboxylic acids include saturated aliphatic dicarboxylic acids exemplified by oxalic acid, malonic acid, succinic acid, glutaric acid, adipic acid, pimelic acid, suberic acid, azelaic acid, sebacic acid, decanedicarboxylic acid, dodecanedicarboxylic acid, tetradecanedicarboxylic acid, hexadecanedicarboxylic acid, 1,3-cyclobutanedicarboxylic acid, 1,3-cyclopentanedicarboxylic acid, 1,2-cyclohexanedicarboxylic acid, 1,3-cyclohexanedicarboxylic acid, 1,4-cyclohexanedicarboxylic acid, 2,5-norbornanedicarboxylic acid, and a dimer acid, or ester-forming derivatives thereof; unsaturated aliphatic dicarboxylic acids exemplified by fumaric acid, maleic acid, and itaconic acid, or ester-forming derivatives thereof; and aromatic dicarboxylic acids exemplified by orthophthalic acid, isophthalic acid, terephthalic acid, 5-(alkali metal) sulfoisophthalic acid, diphenic acid, 1,3-naphthalenedicarboxylic acid, 1,4-naphthalenedicarboxylic acid, 1,5-naphthalenedicarboxylic acid, 2,6-naphthalenedicarboxylic acid, 2,7-naphthalenedicarboxylic acid, 4,4'-biphenyldicarboxylic acid, 4,4'-biphenylsulfonedicarboxylic acid, 4,4'-biphenyletherdicarboxylic acid, 1,2-bis(phenoxy)ethane-p,p'-dicarboxylic acid, pamoic acid, and anthracene dicarboxylic acid, or ester-forming derivatives thereof. Among these dicarboxylic acids, terephthalic acid and naphthalenedicarboxylic acid, especially 2,6-naphthalenedicarboxylic acid, are preferred from the viewpoint of the physical properties of the resulting polyester, and the like, and other dicarboxylic acids are used as a constituent component as necessary. Examples of the polyvalent carboxylic acids other than these dicarboxylic acids include ethanetricarboxylic acid, propanetricarboxylic acid, butanetetracarboxylic acid, pyromellitic acid, trimellitic acid, trimesic acid, 3,4,3',4'-biphenyltetracarboxylic acid, and ester-forming derivatives thereof. Regarding the dicarboxylic acid, at least one kind selected from these can be used.

Examples of the glycols include aliphatic glycols exemplified by ethylene glycol, 1,2-propylene glycol, 1,3-propylene glycol, diethylene glycol, triethylene glycol, 1,2-butylene glycol, 1,3-butylene glycol, 2,3-butylene glycol, 1,4-butylene glycol, 1,5-pentanediol, neopentyl glycol, 1,6-hexanediol, 1,2-cyclohexanediol, 1,3-cyclohexanediol, 1,4-cyclohexanediol, 1,2-cyclohexanedimethanol, 1,3-cyclohexanedimethanol, 1,4-cyclohexanedimethanol, 1,4-cyclohexanediethanol, 1,10-decamethylene glycol, 1,12-dodecanediol, polyethylene glycol, polytrimethylene glycol, and polytetramethylene glycol; and aromatic glycols exemplified by hydroquinone, 4,4'-dihydroxybisphenol, 1,4-bis (3-hydroxyethoxy)benzene, 1,4-bis(R-hydroxyethoxyphenyl)sulfone, bis(p-hydroxyphenyl) ether, bis(p-hydroxyphenyl)sulfone, bis(p-hydroxyphenyl)methane, 1,2-bis(p-hydroxyphenyl)ethane, bisphenol A, bisphenol C, 2,5-naphthalenediol, and glycols obtained by adding ethylene oxide to these glycols. Regarding the glycol, at least one kind selected from these can be used.

Among these glycols, ethylene glycol, 1,3-propylene glycol, 1,4-butylene glycol, and 1,4-cyclohexanedimethanol are preferred. Examples of the polyhydric alcohols other than these glycols include trimethylolmethane, trimethylolethane, trimethylolpropane, pentaerythritol, glycerol, and hexanetriol.

Regarding the polyester, polyethylene terephthalate, polybutylene terephthalate, polypropylene terephthalate, poly(1,4-cyclohexanedimethylene terephthalate), polyethylene naphthalate, polybutylene naphthalate, polypropylene naphthalate, and copolymers thereof are preferred.

An epoxy resin is a resin formed by ring-opening polymerization of an epoxy compound, and examples of the epoxy compound include a phenolic epoxy compound obtainable by a condensation reaction between a polyhydric phenol compound such as bisphenol A glycidyl ether or bisphenol F glycidyl ether and an epihalohydrin compound; an alcohol-based epoxy compound obtainable by condensation of a polyhydric alcohol compound such as hydrogenated bisphenol A glycidyl ether, hydrogenated bisphenol F glycidyl ether, or cyclohexanedimethanol with an epihalohydrin compound; a glycidyl ester-based epoxy compound obtainable by condensation of a polyvalent organic acid compound such as 3,4-epoxycyclohexylmethyl-3',4'-epoxycyclohexanecarboxylate or 1,2-hexahydrophthalic acid diglycidyl ester with an epihalohydrin compound; and an amine-based epoxy compound obtainable by condensation of a primary or secondary amine compound with an epihalohydrin compound. Other examples include aliphatic polyvalent epoxy compounds, such as vinylcyclohexene diepoxide such as 4-vinyl-1-cyclohexane diepoxide. Regarding the epoxy resin, at least one kind selected from these can be used.

The layer constituting the first resin substrate includes a layer obtained by curing a resin or a first curable compound, and at least one layer thereof contains the organic colorant compound.

The resin is preferably a polycarbonate, a polyamide, triacetyl cellulose, or a polyester.

Regarding the monomers included in the first curable composition, a combination of a polyisocyanate compound and a polyol compound, a combination of a polyisocyanate compound and a polythiol compound, a combination of a polyisocyanate compound, a polyol compound, and a polythiol compound, and a combination of a polyepithio compound and a polythiol compound are preferred.

The first curable composition can be obtained by mixing the above-described components by a predetermined method. From the viewpoint of the effects of the present invention, the first curable composition can contain the organic colorant compound in an amount of 5 to 100 ppm, and preferably 7 to 70 ppm, with respect to the entire first resin substrate.

Known additives can be added to the layer constituting the first resin substrate, the layer being obtained by curing a resin or a first curable compound. Examples of the known additives include an internal mold release agent, a resin modifier, a light stabilizer, and a bluing agent.

The mixing order and mixing method for the various components in the composition are not particularly limited as long as the various components can be uniformly mixed, and mixing can be carried out by any known method. Regarding the known method, for example, a method of producing a masterbatch including a predetermined amount of additives, and dispersing and dissolving this masterbatch in a solvent, may be mentioned. For example, in the case of a polyurethane resin, a method of dispersing or dissolving additives in a polyisocyanate compound and thereby producing a masterbatch is available.

According to the present embodiment, at the time of obtaining a polyurethane and a polythiourethane, a polymerization catalyst may or may not be used.

(Internal Mold Release Agent)

Regarding the internal mold release agent, an acidic phosphoric acid ester can be used. Examples of the acidic phosphoric acid ester include phosphoric acid monoesters and phosphoric acid diesters, and these can be respectively used singly or as a mixture of two or more kinds thereof.

For example, ZelecUN manufactured by STEPAN Company; an internal mold release agent for MR manufactured by Mitsui Chemicals, Inc.; JP series manufactured by Johoku Chemical Co., Ltd.; PHOSPHANOL series manufactured by Toho Chemical Industry Co., Ltd.; AP and DP series manufactured by Daihachi Chemical Industry Co., Ltd., and the like can be used.

(Resin Modifier)

Furthermore, a resin modifier can be added to the first curable composition to the extent that does not impair the effects of the present invention, for the purpose of regulating various physical properties such as optical properties, impact resistance, and specific gravity of the resin thus obtainable, and adjusting the viscosity and pot life of the composition.

Examples of the resin modifier include an episulfide compound, an alcohol compound, an amine compound, an epoxy compound, an organic acid and anhydride thereof, and an olefin compound including a (meth) acrylate compound or the like.

(Light Stabilizer)

Regarding the light stabilizer, a hindered amine-based compound can be used. Examples of the hindered amine-based compound include commercially available products such as Lowilite 76 and Lowilite 92 manufactured by Chemtura Corporation; Tinuvin 144, Tinuvin 292, and Tinuvin 765 manufactured by BASF SE; ADEKA STAB LA-52 and LA-72 manufactured by ADEKA Corporation; and JF-95 manufactured by Johoku Chemical Co., Ltd.

(Bluing Agent)

Regarding the bluing agent, an agent having an absorption band in the wavelength region from orange color to yellow color in the visible light region and having a function of adjusting the hue of an optical material made from a resin can be mentioned. More specifically, the bluing agent includes a substance exhibiting from blue color to purple color.

In order to obtain a molded body containing the above-mentioned ultraviolet absorber, the process can be carried out by a method of mixing and polymerizing a first curable composition containing the ultraviolet absorber and a monomer, or a method of curing a first curable composition containing the ultraviolet absorber and a resin.

[Second Resin Substrate]

According to the present embodiment, the second resin substrate is stacked over the surface located on the eye-facing surface side of the polarizing film and is composed of one layer or two or more layers. Regarding the resin included in the layer constituting the second resin substrate, the resins mentioned as examples for the first resin substrate may be mentioned. In a case in which the second resin substrate is composed of two or more layers, the resins included in the respective layers may be identical or different.

Furthermore, at least one layer constituting the second resin substrate may contain an organic colorant compound, and in a case in which the organic colorant compound is included, the organic colorant compounds mentioned as examples for the first resin substrate can be included. The organic colorant compounds included in the first resin substrate and the second resin substrate may be identical or different. According to the present embodiment, the second resin substrate contains the organic colorant compound such that the concentration of the organic colorant compound in the second resin substrate as a whole is lower than the concentration of the organic colorant compound in the first resin substrate.

The second resin substrate can be obtained from a second curable composition. The second curable composition can be obtained by mixing components except for the organic colorant compound, which have been mentioned as examples for the first curable composition, by a similar method. Ina case in which the second curable composition includes an organic colorant compound, the second curable composition can be obtained by mixing the components mentioned as examples for the first curable composition, by a similar method. From the viewpoint of the effects of the present invention, the second curable composition can include the organic colorant compound to be contained in the second resin substrate in an amount of 0.3 to 50 ppm, and preferably 0.5 to 30 ppm.

With regard to the plastic polarizing lens of the present embodiment, it is preferable that the minimum thickness (R1-min) and the maximum thickness (R1-max) of the first resin substrate, and the minimum thickness (R2-min) and the maximum thickness (R2-max) of the second resin substrate satisfy the following Expression.

Expression: R1-min/R1-max>R2-min/R2-max

Since the thickness of the first resin substrate is substantially uniform over the entirety, even if the lens satisfies the above-described formula, the occurrence of color unevenness in the lens base material is suppressed, the external appearance is excellent, and since it is not necessary to discard the colorant or the amount of the colorant to be discarded can be suppressed to a minimal level, the production cost can be suppressed.

According to the present embodiment, the minimum thickness (R1-min) of the first resin substrate is smaller than the minimum thickness (R2-min) of the second resin substrate.

According to the present embodiment, even if a lens in which the difference between R2-min and R2-max is large and which satisfies the above-described formula, is used, the occurrence of color unevenness in the lens base material is suppressed, and the external appearance is excellent.

From the viewpoint of the effects of the present invention, the first resin substrate can contain the organic colorant compound in an amount of 5 to 100 ppm, and preferably 7 to 70 ppm. In a case in which the second resin substrate contains an organic colorant compound, the second resin substrate can contain the organic colorant compound in an amount selected in the range of 0.3 to 50 ppm, and preferably 0.5 to 30 ppm, such that the concentration of the organic colorant compound in the second resin substrate is lower than the concentration of the organic colorant compound in the first resin substrate.

In a case in which the organic colorant compound is included in both the first resin substrate and the second resin substrate, the ratio (b/a) of the content b of the organic colorant compound in the first resin substrate with respect to the content a of the organic colorant compound in the second resin substrate is 2/1 to 100/1, preferably 3/1 to 50/1, and more preferably 5/1 to 20/1. The addition amount of all the organic colorant compounds can be appropriately adjusted within the above-described range so as to obtain a desired transmittance.

According to the present embodiment, from the viewpoint of the effects of the present invention, it is particularly preferable that the second resin substrate does not contain the organic colorant compound.

In the polarizing lens of the present embodiment, the second resin substrate may be polished in accordance with a desired dioptric power, and the thickness of the second resin substrate can be adjusted to 0.1 to 17.0 mm. Specifically, the maximum thickness (R2-max) of the second resin substrate can be adjusted to 1.0 to 17.0 mm, and the minimum thickness (R2-min) can be adjusted to 0.1 to 3.0 mm. Since the second resin substrate does not contain an organic colorant compound or has a small content compared to the case in which the entire amount of the organic colorant compound is included only in the first resin substrate, even though partial differences occur in the layer thickness of the second resin substrate, the occurrence of color unevenness in the lens base material is suppressed, and the external appearance is excellent.

The plastic polarizing lens includes a coating layer on one surface or both surfaces, as necessary. Examples of the coating layer include a primer layer, a hard coat layer, an antireflective film layer, an antifogging coat layer, an antifouling layer, and a water-repellent layer, all of which may contain an organic colorant compound. The primer layer may be formed, in a case in which the first resin substrate or the second resin substrate is composed of two or more layers, in order to improve the adhesiveness between the various layers.

The coating layer may be a single layer, or a plurality of coating layers may be laminated. In a case in which the plastic polarizing lens includes a coating layer on both surfaces, the plastic polarizing lens may include similar coating layers or may include different coating layers, on the respective surfaces.

The plastic polarizing lens of the present embodiment includes
- a polarizing film comprised of a thermoplastic resin;
- a first resin substrate composed of at least one layer stacked over a surface of the polarizing film which is located on an object-facing surface side; and
- a second resin substrate composed of at least one layer stacked over a surface located on the eye-facing surface side of the polarizing film,
- in which it is preferable that one layer constituting the first resin substrate contains an organic colorant compound, and the second resin substrate does not contain an organic colorant compound.

In such a plastic polarizing lens, the occurrence of color unevenness in the lens base material is further suppressed, the external appearance is superior, and also, since it is not necessary to discard the colorant, the manufacturing cost can be significantly suppressed.

The first resin substrate can contain the organic colorant compound in an amount of 5 to 100 ppm, and preferably 7 to 70 ppm.

<Method for Manufacturing Plastic Polarizing Lens>

Regarding the method for manufacturing the plastic polarizing lens according to the present invention, the following modes can be used.

1. A method of producing a first resin substrate (first lens base material) containing an organic colorant compound and a second resin substrate (second lens base material) that optionally contain an organic colorant compound at a concentration lower than that of the first resin substrate, and stacking the resin substrates on both surfaces of the polarizing film
2. A method of disposing a mold and a polarizing film in a state of being separated apart at a predetermined distance, with a first curable composition layer containing an organic colorant compound interposed therebetween, subsequently injecting a second curable composition that optionally contain an organic colorant compound at a concentration lower than that of the first curable composition into the cavity of the mold, and curing the second curable composition
3. A method of injecting a first curable composition and a second curable composition respectively including an organic colorant compound, into the two cavities formed between a mold and both surfaces of a polarizing film, the second curable composition possibly including the organic colorant compound at a concentration lower than that of the first curable composition, and curing the curable compositions Hereinafter, embodiments will be described one by one.

First Embodiment

The method for manufacturing a plastic polarizing lens of the present embodiment includes:
preparing a first resin substrate containing an organic colorant compound;
preparing a second resin substrate that optionally contain an organic colorant compound at a concentration lower than that of the first resin substrate; and
stacking the first resin substrate to a surface located on an object-facing surface side of a polarizing film comprised of a thermoplastic resin, and also stacking the second resin substrate to a surface located on an eye-facing surface side of the polarizing film.

The first resin substrate or the second resin substrate can be obtained by molding while curing the above-mentioned first curable composition or second curable composition so as to have a predetermined shape.

Stacking of the first resin substrate or the second resin substrate to the polarizing film can be carried out by a conventionally known method.

After the process of stacking the second resin substrate, a process of polishing the second resin substrate according to a desired dioptric power can be included. Although partial differences occur in the film thickness of the second resin substrate, since the second resin substrate does not contain an organic colorant compound, or the content of the organic colorant compound is small compared to the case in which the entire amount of the organic colorant compound is included only in the first resin substrate, the occurrence of coloru unevenness is suppressed, and the external appearance is excellent. Furthermore, since it is not necessary to discard the colorant during a polishing process, or the amount of the colorant to be discarded can be suppressed to a minimal level, the manufacturing cost can be suppressed.

According to the present embodiment, from the viewpoint of the above-described effects, it is preferable that the second resin substrate does not contain an organic colorant compound.

Second Embodiment

The method for manufacturing a plastic polarizing lens of the present embodiment has the following steps.
Step (1): A first mold substrate having a forming surface for forming an object-facing surface of a lens and a polarizing film comprised of a thermoplastic resin are separated apart at a predetermined distance, such that the forming surface and the polarizing film are separated by interposing a first curable composition layer containing an organic colorant compound therebetween.
Step (2): The outer edge of the first mold substrate, the outer edge of the polarizing film, and the outer edge of a second mold substrate having a forming surface for forming an eye-facing surface of the lens are covered with a fixing member, and the second mold substrate is disposed so as to face the polarizing film while being separated apart therefrom at a predetermined distance.
Step (3): A second curable composition that optionally contain an organic colorant compound at a concentration lower than that of the first curable composition is injected into the gap between the polarizing film and the second mold substrate.
Step (4): The first curable composition layer and the injected second curable composition are cured, and thereby a first resin substrate and a second resin substrate are formed on both surfaces of the polarizing film.
Step (5): The fixing member, the first mold substrate, and the second mold substrate are removed, and then a plastic lens is taken out.

In the plastic polarizing lens obtainable by the manufacturing method of the present embodiment, although partial differences occur in the film thickness of the second resin substrate, since the second resin substrate does not contain an organic colorant compound, or the content of the organic colorant compound is small compared to the case in which the entire amount of the organic colorant compound is included only in the first resin substrate, the occurrence of color unevenness is suppressed, and the external appearance is excellent. Furthermore, since it is not necessary to discard the colorant during a polishing process, or the amount of the colorant to be discarded can be suppressed to a minimal level, the manufacturing cost can be suppressed. According to the present embodiment, from the viewpoint of the above-described effects, it is preferable that the second curable composition does not contain an organic colorant compound.

Hereinafter, the method for manufacturing a plastic polarizing lens of the second embodiment will be further described by way of Embodiments 2a to 2d.

Embodiment 2a

The method for manufacturing a plastic polarizing lens of the present embodiment has the following steps.
Step a: A first curable composition containing a predetermined amount of an organic colorant compound is placed on a first mold substrate having a forming surface for forming an object-facing surface of a lens, the first curable composition being disposed on the forming surface.
Step b: The first curable composition is spread over the entire surface of the forming surface with a polarizing film, and the first mold substrate and the polarizing film are separated apart at a predetermined distance by interposing the first curable composition layer therebetween.
Step c: The outer edge of the first mold substrate, the outer edge of the polarizing film, and the outer edge of a second mold substrate having a forming surface for forming the other surface of the lens are covered with a fixing member, and the second mold substrate is disposed so as to face the polarizing film while being separated apart therefrom at a predetermined distance.
Step d: The first curable composition layer is semi-cured, and a semi-cured layer is formed.

Step e: A second curable composition that optionally contain an organic colorant compound at a concentration lower than that of the first curable composition is injected into the gap between the polarizing film and the second mold substrate.

Step f: The semi-cured layer of the first curable composition and the injected second curable composition are cured, and thereby base material layers are formed on both surfaces of the polarizing film.

Step g: The fixing member, the first mold substrate, and the second mold substrate are removed, and then a plastic lens is taken out.

(Step a)

First, a predetermined amount of a first curable composition is placed on a first mold substrate having a forming surface for forming an object-facing surface of a lens, the first curable composition being disposed on the forming surface.

The first mold substrate is generally formed from glass.

The forming surface of the first mold substrate is a concave surface having a predetermined curved surface shape. In the present embodiment, an example in which the forming surface is a concave surface for forming an object-facing surface (convex surface) of a lens, will be described. It is also acceptable that the forming surface is a convex surface for forming an object-facing surface (concave surface) of a lens.

The first curable composition is a composition obtained by mixing a monomer with additives such as a catalyst and subjecting the mixture to degassing, filtering, and the like as necessary. In the present embodiment, the curable composition can also be referred to as a polymerizable composition.

The first curable composition is prepared by mixing a monomer and additives such as a catalyst, usually degassing the mixture under a reduced pressure of about 0.1 to 100 Torr for about 0.1 to 5 hours, and filtering the mixture with a filter having a pore size of about 0.1 to 10 μm to be used.

The viscosity of the first curable composition at 20° C., which is measured with a B-type viscometer, is usually in the range of 1 to 500 mPa·s, and preferably in the range of 10 to 200 mPa·s. When the viscosity is in this range, the first curable composition is easily spread out on the forming surface, and it is also easy to separate between the first mold substrate and the film uniformly.

The amount of the first curable composition to be placed is calculated from the area of the forming surface, the desired separation distance between the first mold substrate and the polarizing film, and the specific gravity of the first curable composition. The diameter of the first mold substrate is usually about 60 to 90 mm, and the separation distance is usually set in the range of 0.1 to 3.0 mm, and preferably 0.2 to 2.0 mm.

(Step b)

The first curable composition is spread over the entire surface of the forming surface with the polarizing film to form a first curable composition layer 14a, and the first mold substrate and the polarizing film are separated apart at a predetermined distance by interposing the first curable composition layer 14a therebetween.

Upon spreading out the first curable composition over the entire surface of the forming surface, there is no particular limitation as long as the entire surface of the polarizing film can be pressed from above. Usually, pressing by means of the own weight of the film is sufficient; however, it is also acceptable that the polarizing film is pressed from above while being attached to a pressing member having a curved surface similar to that of the polarizing film.

It can be easily visually confirmed that the first mold substrate and the polarizing film are separated apart at a predetermined distance.

(Step c)

The outer edge of the first mold substrate, the outer edge of the polarizing film, and the outer edge of a second mold substrate for forming the other surface of the lens are fixed by covering these outer edges with a fixing member, and the second mold substrate is disposed so as to face the polarizing film while being separated apart therefrom at a predetermined distance.

The second mold substrate is generally formed from glass. The second mold substrate may be identical to or different from the first mold substrate.

Examples of the fixing member include a tape and a gasket. In the case of a tape, the tape is wound around the outer edge of the first mold substrate, the outer edge of the polarizing film, and the outer edge of the second mold substrate so as to cover them, and these members are fixed.

Regarding the tape, usually, a tape produced by applying a tacky adhesive such as a siloxane-based, (meth)acrylic, epoxy-based, or rubber-based adhesive on a base material made of polyethylene, polypropylene, polyethylene terephthalate, polyethylene isophthalate, polyethylene naphthalate, polyphenylene sulfide, polyester, polycarbonate, polyvinyl chloride, TEFLON (registered trademark), a polysiloxane resin, a polyimide resin, cellulose, or the like, or a mixture or a copolymerization product of those, is used. For the purpose of decreasing the water vapor permeability of the tape, for example, forming a quartz film or the like by vapor depositing silicon oxide or the like on the tape, coating the tape with an organic coating agent, an inorganic coating agent, or a mixture thereof, or stacking another base material having low water vapor permeability to the tape, is also carried out. Regarding the thickness of the tape, from the viewpoints of operability, dimensional stability of the molded product, airtightness in the vicinity of the boundary at an overlapping portion, strength, and the like, a tape having a thickness in the range of 10 to 200 μm is commonly used.

Regarding the gasket, usually, a molded article obtained using a thermoplastic resin can be suitably used, and from the viewpoints of moldability, flexibility, heat resistance, monomer stability, price, and the like, it is preferable to use an olefin-based elastomer. Specific examples of the olefin-based elastomer include a polyethylene-based elastomer formed from a low-density polyethylene, a polypropylene-based elastomer in which a rubber component is finely dispersed in polypropylene homopolymer, an ethylene-vinyl acetate copolymer, and an ethylene-alkyl acrylate copolymer.

The gasket used in the present embodiment does not need to have a special shape, and a gasket having an ordinary shape used for the production of a white lens that does not have any film inserted therein can be used as received.

As a result, a gap surrounded by the polarizing film, the second mold substrate, and the fixing member is formed.

(Step d)

The first curable composition is semi-cured, and a semi-cured layer is formed.

Thereby, the polarizing film can be positioned. Semi-curing means curing with heat or ultraviolet radiation to a state in which the position of the polarizing film will not move.

In the present step, specifically, the first curable composition layer is semi-cured such that the position of the polarizing film is in a state of being immovable at a position separated by 0.1 to 3.0 mm from the forming surface of the first mold substrate.

The storage modulus at 20° C. of the semi-cured first curable composition is usually selected to be in the range of 0.01 Pa to 100,000 Pa, and particularly preferably in the range of 0.1 Pa to 1,000 Pa, from the viewpoint that the polarizing film should not move in the subsequent step and from the viewpoint of performance such as the profile irregularity of the resulting lens.

In a case in which the first curable composition is a (thio) urethane-based material, from the viewpoints as described above, semi-curing is usually achieved to a degree of polymerization selected in the range of 30% to 70%, and particularly preferably in the range of 40% to 60%. The degree of polymerization is measured by performing a differential thermal analysis to find out what percentage of heat has been generated with respect to the total amount of heat generation until the polymerization is completed and the generation of the heat of polymerization is completed.

Through step a to step d, a composite body in which a first mold substrate having a forming surface for forming an object-facing surface of a lens, a semi-cured first curable composition layer (semi-cured layer) formed over the entire forming surface of the first mold substrate, and the above-mentioned polarizing film are laminated in sequence is obtained.

In this composite body, the first curable composition layer is semi-cured, and the position of the polarizing film with respect to the forming surface of the first mold substrate is determined. Since this composite body can be transported, the subsequent steps can be carried out in other places.

(Step e)

A second curable composition is injected into the gap between the polarizing film and the second mold substrate by a predetermined means. In a case in which the second curable composition contains an organic colorant compound, the second curable composition may have the same composition as the first curable composition or may have a different composition. In a case in which the second curable composition does not contain an organic colorant compound, the composition other than the organic colorant compound may be a composition identical to or different from that of the first curable composition. According to the present embodiment, from the viewpoint of the effects of the present invention, it is preferable that the second curable composition does not contain an organic colorant compound.

(Step f)

The semi-cured layer of the first curable composition and the injected second curable composition are cured, and thereby base material layers are formed on both surfaces of the polarizing film.

Curing is performed by means of heat or ultraviolet radiation. In the case of thermal curing, it is general to gradually increase the temperature from a low temperature to 80° C. to 150° C. over 6 to 50 hours.

(Step g)

After the curing is completed, the fixing member, the first mold substrate, and the second mold substrate are removed, and thereby a plastic lens in which a base material layer and a base material layer are stacked over both sides of the film is obtained.

Regarding the lens thus obtained, the released lens is subjected to an annealing treatment by heating as necessary, for the purpose of strain relaxation and the like. The annealing temperature is usually in the range of 80° C. to 150° C., and preferably in the range of 90° C. to 130° C. The annealing time is usually in the range of 0.5 to 10 hours, and preferably in the range of 1 to 6 hours.

With regard to Embodiment 2a, an example in which step c of fixing the outer edge of the first mold substrate, the outer edge of the polarizing film, and the outer edge of the second mold substrate for forming the other surface of the lens by covering these outer edges with a fixing member, and disposing the second mold substrate so as to face the polarizing film while being separated apart therefrom at a predetermined distance is carried out, and then step d of semi-curing the first curable composition is carried out, has been described; however, it is also acceptable to carry out step c after step d is carried out.

A plastic polarizing lens can be produced by the above-described processes.

Embodiment 2b

The method for manufacturing a plastic polarizing lens of the present embodiment has the following steps.

Step a: A first curable composition containing a predetermined amount of an organic colorant compound is placed on a first mold substrate having a forming surface for forming an object-facing surface of a lens, the first curable composition being disposed on the forming surface.

Step b: A spacer is placed on the forming surface of the first mold substrate that has the forming surface for forming an object-facing surface of a lens.

Step c: The first curable composition is spread over the entire surface of the forming surface with a polarizing film, and the first mold substrate and the polarizing film are separated apart at a predetermined distance by interposing the first curable composition layer therebetween.

Step d: The outer edge of the first mold substrate, the outer edge of the spacer, the outer edge of the polarizing film, and the outer edge of a second mold substrate for forming the other surface of the lens are fixed by covering these outer edges with a fixing member, and the second mold substrate is disposed so as to face the film while being separated apart therefrom at a predetermined distance.

Step e: The first curable composition layer is semi-cured, and a semi-cured layer is formed.

Step f: A second curable composition that optionally contain an organic colorant compound at a concentration lower than that of the first curable composition is injected into the gap between the polarizing film and the second mold substrate.

Step g: The semi-cured layer of the first curable composition and the injected second curable composition are cured, and thereby base material layers are formed on both surfaces of the film.

Step h: The fixing member, the first mold substrate, and the second mold substrate are removed, and then a plastic lens is taken out.

Step a, step c, step d, step e, step f, step g, and step h are similar to those of Embodiment 2a, and further description thereof will not be repeated.

(Step b)

It is preferable that a spacer for determining the position of the film more accurately is placed on the forming surface for forming an object-facing surface of a lens.

By placing the spacer along the outer periphery of the forming surface for forming an object-facing surface of a lens, the position of the polarizing film can be determined more reliably.

Regarding the spacer, various forms can be employed as long as they can be placed along the outer periphery of the forming surface for forming an object-facing surface of a lens. A ring shape is preferably used; however, a plurality of blocks may also be used.

Regarding the spacer, any spacer that has a predetermined height, can withstand the heat of polymerization and curing, and does not adversely affect the lens, can be used; however, in view of factors such as the ease of molding and cost, plastics such as polyethylene (PE), polypropylene (PP), polyvinyl chloride (PVA), an ethylene-vinyl acetate copolymer resin (EVA), and polytetrafluoroethylene (PTFE) are preferably used.

In a case in which the spacer is in close contact with the lens to be taken out in step h, the spacer is removed during a polishing process or a lens shaping processing (polishing processing into a shape matching the frame).

With regard to Embodiment 2b, an example in which step a of placing the first curable composition on the forming surface of the first mold substrate is carried out, and then step b of placing a spacer on the forming surface of the first mold substrate having a forming surface for forming an object-facing surface of a lens is carried out, has been described; however, it is also acceptable to carry out step a after step b is carried out.

Furthermore, similarly to Embodiment 2a, also with regard to Embodiment 2b, an example in which step d of fixing the outer edge of the first mold substrate, the outer edge of the film, and the outer edge of the second mold substrate for forming the other surface of the lens by covering these outer edges with a fixing member, and disposing the second mold substrate so as to face the polarizing film while being separated apart therefrom at a predetermined distance, is carried out, and then step e of semi-curing the first curable composition layer 14a is carried out, has been described; however, it is also acceptable to carry out step d after step e is carried out.

Embodiment 2c

The method for manufacturing a plastic polarizing lens of the present embodiment has the following steps.

Step a: A first curable composition containing an organic colorant compound having a viscosity of 1,000 to 100,000 mPa·s is placed on a first mold substrate having a forming surface for forming an object-facing surface of a lens, the first curable composition being placed on the forming surface.

Step b: The first curable composition is spread over the entire surface of the forming surface with a polarizing film, and the first mold substrate and the polarizing film are separated apart at a predetermined distance by interposing the formed first curable composition layer therebetween.

Step c: The outer edge of the first mold substrate, the outer edge of the polarizing film, and the outer edge of a second mold substrate having a forming surface for forming the other surface of the lens are fixed by covering these outer edges with a fixing member, and the second mold substrate is disposed so as to face the polarizing film while being separated apart therefrom at a predetermined distance.

Step d: A second curable composition that optionally contain an organic colorant compound at a concentration lower than that of the first curable composition is injected into the gap between the polarizing film and the second mold substrate.

Step e: The first curable composition layer and the injected second curable composition are cured, and thereby base material layers are formed on both surfaces of the polarizing film.

Step f: The fixing member, the first mold substrate, and the second mold substrate are removed, and then a plastic lens is taken out.

Step b, step c, step d, step e, and step f are similar to those of Embodiment 2a, except that the step numbers are different, and further description thereof will not be repeated.

(Step a)

In this step, from the viewpoint that the polarizing film should not move in the subsequent step and from the viewpoint of performance such as the profile irregularity of the resulting lens, a first curable composition having a viscosity of 1,000 to 100,000 mPa·s can be used, and the viscosity can be adjusted to preferably 2,000 to 80,000 mPa·s, more preferably 3,000 to 50,000 mPa·s, and particularly preferably 4,000 to 30,000 mPa·s. The viscosity of the first curable composition is the viscosity at 20° C. measured with a B-type viscometer. Meanwhile, the step can be carried out by a similar operation using components similar to those of step a of Embodiment 2a, except that a first curable composition having a viscosity in the above-described range is used.

In order to adjust the viscosity of the first curable composition, the viscosity can be adjusted by preparing the first curable composition and then leaving the first curable composition to stand until a desired viscosity is acquired. Usually, a preferable viscosity can be reached by leaving the first curable composition at normal temperature for a time period in the range of 1 to 200 hours. Furthermore, the first curable composition may be stirred. The standing time may be shortened by heating.

The placement of the first curable composition having a viscosity of 1,000 to 100,000 mPa·s on the first mold substrate includes not only a method of placing a first curable composition having the viscosity adjusted to be within the above-described range as described above, on the first mold substrate; but also a method of leaving a low-viscosity first curable composition placed on the first mold substrate, to stand on the first mold substrate until the viscosity range is reached.

Through step a to step c, a composite body in which a first mold substrate having a forming surface for forming an object-facing surface of a lens, a first curable composition layer having a viscosity of 1,000 to 100,000 mPa·s formed over the entire forming surface of the first mold substrate, and the above-described polarizing film are laminated in sequence, is obtained.

In this composite body, the first curable composition layer has a predetermined viscosity, and the position of the polarizing film with respect to the forming surface of the first mold substrate is determined. Since this composite body can be transported, the subsequent steps can be carried out in other places.

Furthermore, not after the lens product is obtained, but in the stage of the composite body as an intermediate compound, the position of the polarizing film is checked in advance by visually recognizing the separation distance between the forming surface and the film, and it is possible to know in advance whether or not there is a defect that the polarizing film is exposed from an eye-facing surface in a final product with the eye-facing surface polished. Therefore, the product yield and productivity of lens products are dramatically improved.

Embodiment 2d

The method for manufacturing a plastic polarizing lens of the present embodiment has the following steps.

Step a: A first curable composition containing an organic colorant compound having a viscosity of 1,000 to 100,000 mPa·s is placed on a first mold substrate having a forming surface for forming a lens surface, the first curable composition being placed on the forming surface.

Step b: A spacer is placed on the forming surface of the first mold substrate.

Step c: The first curable composition is spread over the entire surface of the forming surface with a polarizing film, and the first mold substrate and the polarizing film are separated apart at a predetermined distance by interposing the first curable composition layer therebetween.

Step d: The outer edge of the first mold substrate, the outer edge of the spacer, the outer edge of the polarizing film, and the outer edge of a second mold substrate for forming the other surface of the lens are fixed by covering these outer edges with a fixing member, and the second mold substrate is disposed so as to face the polarizing film while being separated apart therefrom at a predetermined distance.

Step e: A second curable composition that optionally contain an organic colorant compound at a concentration lower than that of the first curable composition is injected into the gap between the polarizing film and the second mold substrate.

Step f: The first curable composition layer and the injected second curable composition are cured, and thereby base material layers are formed on both surfaces of the polarizing film.

Step g: The fixing member, the first mold substrate, and the second mold substrate are removed, and then a plastic lens is taken out.

Step a and step e are similar to those of Embodiment 2c, while step b, step c, step d, step f, and step g are similar to those of Embodiment 2b, and further description will not be repeated.

Third Embodiment

The method for manufacturing a plastic polarizing lens of the present embodiment has the following steps.

Step a: The outer edge of a first mold substrate having a forming surface for forming an object-facing surface of a lens, the outer edge of a polarizing film comprised of a thermoplastic resin, and the outer edge of the second mold substrate having a forming surface for forming an eye-facing surface of the lens are covered with a fixing member, and the polarizing film is fixed in a state of being separated apart from the forming surface of the first mold substrate and the forming surface of the second mold substrate.

Step b: A first curable composition containing an organic colorant compound is injected into a gap between the polarizing film and the first mold substrate.

Step c: A second curable composition that optionally contain an organic colorant compound at a concentration lower than that of the first curable composition is injected into a gap between the polarizing film and the second mold substrate.

Step d: The first curable composition and the second curable composition are polymerized and cured, and thereby a first resin substrate and a second resin substrate are formed on both surfaces of the polarizing film.

Step e: The fixing member, the first mold substrate, and the second mold substrate are removed, and a plastic polarizing lens is taken out.

In the plastic polarizing lens obtainable by the manufacturing method of the present embodiment, partial differences occur in the film thickness of the second resin substrate; however, since the second resin substrate does not contain an organic colorant compound, or the content of the organic colorant compound is small compared to the case in which the entire amount of the organic colorant compound is included only in the first resin substrate, the occurrence of color unevenness is suppressed, and the external appearance is excellent. Furthermore, since it is not necessary to discard the colorant during a polishing process, or the amount of the colorant to be discarded can be suppressed to a minimal level, the manufacturing cost can be suppressed. According to the present embodiment, from the viewpoint of the effects of the present invention, it is preferable that the second curable composition does not contain an organic colorant compound.

(Step a)

In the present step, a first mold substrate, a second mold substrate, and a polarizing film are fixed with a fixing member such that both surfaces of the polarizing film are respectively arranged to be parallel to the forming surface of the first mold substrate for forming an object-facing surface of a lens, the forming surface of the second mold substrate for forming an eye-facing surface of the lens, and the film surfaces. Gaps are formed respectively between the polarizing film and the first mold substrate, and between the polarizing film and the second mold substrate. The separation distance a, where the gap of the gap is the narrowest, is about 0.2 to 2.0 mm.

Regarding the fixing member, a tape, a gasket, and the like similar to those used in step c according to the above-described Embodiment 2a can be used.

(Steps b to d)

Step b and step c can be carried out similarly to step e of Embodiment 2a; however, step b and step c may be carried out simultaneously, step c may be carried out after step b, step b may be carried out after step c, or the injection rates in step b and step c may be changed.

Step d can be carried out under conditions similar to those of step f of Embodiment 2a. Step e can be carried out similarly to step g of Embodiment 2a.

As the plastic polarizing lenses obtainable in the present first embodiment, the present Embodiments 2a to 2d, and the present third embodiment, regarding a form of obtaining a lens in which the occurrence of color unevenness is suppressed, the amount of the colorant to be discarded is suppressed to a minimal level, and the polarizability and contrast are excellent, which are the effects of the present invention, it is more preferable that the first resin substrate contains a predetermined amount of an organic colorant compound, and the second resin substrate contains an organic colorant compound at a concentration lower than the colorant concentration included in the first resin substrate.

In a case in which an organic colorant compound is included in the first resin substrate and the second resin substrate, the ratio (b/a) of the content b of the organic colorant compound in the first resin substrate to the content a of the organic colorant compound in the second resin substrate is 2/1 to 100/1, preferably 3/1 to 50/1, and more preferably 5/1 to 20/1. The addition amount of all the organic colorant compounds can be appropriately adjusted within the above-described range so as to obtain a desired transmittance.

The plastic lenses obtainable in the first embodiment, the embodiments 2a to 2d, and the third embodiment are used after being provided with a coating layer on one surface or both surfaces as necessary. Examples of the coating layer include a primer layer, a hard coat layer, an antireflective film layer, an antifogging coat layer, an antifouling layer and a water-repellent layer. The primer layer may be formed, in a case in which the first resin substrate or the second resin substrate is composed of two or more layers, in order to improve the adhesiveness between the various layers. These coating layers may each contain an organic colorant compound. These coating layers may be used singly, or a plurality of coating layers may be used in a multilayer form. In a case in which a coating layer is provided on both surfaces, similar coating layers may be provided or different coating layers may be provided, on the respective surfaces.

In these coating layers, an ultraviolet absorber intended for protecting the lens and the eyes from ultraviolet radiation; an infrared absorber intended for protecting the eyes from infrared radiation; a light stabilizer or an oxidation inhibitor intended for enhancing the weather resistance of the lens; a dye or a pigment intended for enhancing the fashionability of the lens; furthermore, a photochromic dye or a photochromic pigment; an antistatic agent, and other known additives intended for enhancing the performance of the lens, may be used in combination. Various leveling agents may also be used for the purpose of improving the coatability.

A primer layer is generally formed between the lens base material and a hard coat layer for the purpose of enhancing the adhesiveness of the hard coat layer and the impact resistance of the lens, and the film thickness thereof is usually about 0.1 to 10 µm.

The primer layer is formed by, for example, a coating method or a dry method. In the coating method, a primer layer is formed by applying a primer composition by a known coating method such as spin coating or dip coating and then solidifying the primer composition. In the dry method, a primer layer is formed by a known dry method such as a CVD method or a vacuum vapor deposition method. On the occasion of forming the primer layer, the surface of the lens may be subjected to a pretreatment such as an alkali treatment, a plasma treatment, or an ultraviolet treatment, if necessary, for the purpose of enhancing the adhesiveness.

Regarding the primer composition, a material that produces, when solidified, a primer layer having high adhesiveness to a lens base material is preferred, and usually, a primer composition containing a urethane-based resin, an epoxy-based resin, a polyester-based resin, a melanin-based resin, or polyvinyl acetal as a main component, and the like are used. The primer composition can be used without a solvent; however, an appropriate solvent that does not affect the lens may also be used for the purpose of adjusting the viscosity of the composition, or the like.

A hard coat layer is a coating layer intended to impart functions such as scratch resistance, abrasion resistance, moisture resistance, warm water resistance, heat resistance, and weather resistance to the lens surface, and the film thickness thereof is usually about 0.3 to 30 µm.

The hard coat layer is usually formed by applying a hard coat composition by a known coating method such as spin coating or dip coating, and then curing the hard coat composition. Examples of the curing method include a thermal curing method and a curing method by irradiation with energy rays such as ultraviolet rays and visible rays. On the occasion of forming the hard coat layer, the coated surface (lens base material or primer layer) may be subjected to a pretreatment such as an alkali treatment, a plasma treatment, or an ultraviolet treatment as necessary, for the purpose of enhancing adhesiveness.

Regarding the hard coat composition, generally, mixtures of a curable organosilicon compound and oxide microparticles (including complex oxide microparticles) of Si, Al, Sn, Sb, Ta, Ce, La, Fe, Zn, W, Zr, In, Ti, and the like are often used. Furthermore, in addition to these, amines, amino acids, metal acetylacetonate complexes, organic acid metal salts, perchloric acids, salts of perchloric acids, acids, metal chlorides, polyfunctional epoxy compounds, and the like may also be used. The hard coat composition can be used without a solvent; however, an appropriate solvent that does not affect the lens may also be used.

An antireflective layer is usually formed on the hard coat layer, if necessary. The antireflective layer includes an inorganic type layer and an organic type layer. In the case of the inorganic type layer, generally, the layer is often formed using an inorganic oxide such as $SiO_2$ or $TiO_2$, by a dry method such as a vacuum vapor deposition method, a sputtering method, an ion plating method, an ion beam assist method, or a CVD method. In the case of the organic type layer, generally, the layer is often formed by a wet method using a composition containing an organosilicon compound and silica-based microparticles having internal cavities.

The antireflective layer may be a single layer or a multilayer; however, in a case in which the antireflective layer is used as a single layer, it is preferable that the refractive index thereof is lower than the refractive index of the hard coat layer by at least 0.1 or more. In order to exhibit the antireflection function effectively, it is preferable to use a multilayer antireflective film, and in that case, usually, a low-refractive index film and a high-refractive index film are laminated alternately. Also in this case, it is preferable that the difference between the refractive indices of the low-refractive index film and the high-refractive index film is 0.1 or more. Examples of the high-refractive index film include films of $ZnO$, $TiO_2$, $CeO_2$, $Sb_2O_5$, $SnO_2$, $ZrO_2$, $Ta_2O_5$ and the like, and examples of the low-refractive index film include a $SiO_2$ film. The film thickness is usually about 50 to 150 nm.

Thus, the embodiments of the present invention have been described above; however, these are merely examples of the present invention, and various configurations other than the above-described ones can be employed to the extent that does not impair the effects of the present invention.

In the method for manufacturing a plastic polarizing lens of the present embodiment, the various steps of the embodiments can be combined appropriately.

For example, a first resin substrate containing an organic colorant compound is prepared and then is stuck to the surface located on the object-facing surface side of the polarizing film, and subsequently a second resin substrate is formed by cast polymerizing a second curable composition on the other surface of the polarizing film. Thus, a polarizing lens can be obtained. In contrast, a second resin substrate is prepared and then is stuck to the surface located on the eye-facing surface side of the polarizing film, subsequently a first curable composition containing an organic colorant compound is cast polymerized on the other surface, and thereby a first resin substrate is formed. Thus, a polarizing lens can be obtained.

In regard to the method for manufacturing a plastic polarizing lens of the present embodiment, in a case in which the first resin substrate has two or more layers, the various steps of the present embodiment can be combined appropriately.

For example, a resin substrate that does not contain an organic colorant compound is stuck to the surface located on the object-facing surface side of the polarizing film, subsequently a resin substrate containing an organic colorant compound, which has been prepared in advance, is further stuck to the resin substrate, and thereby, a first resin substrate can be formed. The order of these steps may be reversed. Furthermore, the first resin substrate can be produced into a multilayer substrate by appropriately performing these steps a plurality of times.

Alternatively, a resin substrate that does not contain an organic colorant compound is stuck to the surface located on the object-facing surface side of the polarizing film, subsequently a curable composition containing an organic colorant compound is applied or cast polymerized on the resin substrate, and thereby a first resin substrate can be formed. The order of these steps may be reversed. Furthermore, the first resin substrate can be produced into a multilayer substrate by appropriately performing these steps a plurality of times.

Furthermore, a resin substrate is formed by cast polymerizing a curable composition that does not contain an organic colorant compound on the surface located on the object-facing surface side of the polarizing film, subsequently a curable composition containing an organic colorant compound is applied or cast polymerized on the resin substrate, and thereby a first resin substrate can be formed. The order of these steps may be reversed. Furthermore, the first resin substrate can be produced into a multilayer substrate by appropriately performing these steps a plurality of times.

In a case in which the second resin substrate has two or more layers, the layers can be laminated in the same manner as described above. The resin substrate or the curable composition, both of which constitute the second resin substrate, may not contain an organic colorant compound.

EXAMPLES

The present invention will be described in more detail by way of Examples; however, the present invention is not intended to be limited to these examples.

[Preparation of Curing Composition]
<Preparation of Curable Composition 1>

50.6 parts by weight of m-xylylene diisocyanate, 49.4 parts by weight of a mixture of 4,8-dimercaptomethyl-1,11-dimercapto-3,6,9-trithiaundecane, 4,7-dimercaptomethyl-1,11-dimercapto-3,6,9-trithiaundecane, and 5,7-dimercaptomethyl-1,11-dimercapto-3,6,9-trithiaundecane, 0.01 parts by weight of dibutyltin dichloride as a curing accelerator, 0.15 parts by weight of ZelecUN (registered trademark, manufactured by Stepan Company) as a mold release agent, 0.005 parts by weight of PD-311S (manufactured by Yamamoto Chemicals, Inc.) as an organic colorant compound, and 1.50 parts by weight of Seesorb 709 (manufactured by Shipro Kasei Kaisha, Ltd.) as an ultraviolet absorber were stirred and dissolved, subsequently the mixture was subjected to a defoaming treatment under reduced pressure, and thereby curable composition 1 was prepared.

<Preparation of Curable Composition 2>

Curable composition 2 was prepared by operating in the same manner as in the preparation of the curable composition 1, except that PD-311S (manufactured by Yamamoto Chemicals, Inc.) as the organic colorant compound was used in an amount of 0.002 parts by weight.

<Preparation of Curable Composition 3>

Curable composition 3 was prepared by operating in the same manner as in the preparation of the curable composition 1, except that PD-311S (manufactured by Yamamoto Chemicals, Inc.) as the organic colorant compound was used in an amount of 0.001 parts by weight.

<Preparation of Curable Composition 4>

Curable composition 4 was prepared by operating in the same manner as in the preparation of the curable composition 1, except that PD-311S (manufactured by Yamamoto Chemicals, Inc.) as the organic colorant compound was used in an amount of 0.0002 parts by weight.

<Preparation of Curable Composition 5>

Curable composition 5 was prepared by operating in the same manner as in the preparation of the curable composition 1, except that PD-311S (manufactured by Yamamoto Chemicals, Inc.) as the organic colorant compound was not used.

<Preparation of Curable Composition 6>

Curable composition 6 was prepared by operating in the same manner as in the preparation of the curable composition 1, except that PD-311S (manufactured by Yamamoto Chemicals, Inc.) as the organic colorant compound was used in an amount of 0.003 parts by weight.

[Preparation of Shaped Polarizing Film]

A polarizing film made of polyvinyl alcohol was heated at a temperature of 100° C. for 0.5 hours using a hot air circulation type oven. The heated film body was allowed to absorb moisture and was shaped into a curved shape of 6C (Curve) using a glass mold. The polarizing film was cut according to the size of the mold and then was dried under the conditions of a temperature of 80° C. and a pressure of 30 torr, and thus a shaped polarizing film was obtained.

[Evaluation of Polarizing Lens]

A polarizing lens obtained by cutting and polishing the eye-facing surface of a semi-finished polarizing lens was evaluated according to the following criteria.

External appearance (color unevenness): A case in which when evaluated by visual inspection, color unevenness was not felt was rated as A; a case in which the shades of colors could be felt but only very weakly was rated as B; a case in which the shades of colors were slightly felt was rated as C; and a case in which the shades of colors were strongly felt was rated as D.

Contrast: Five test subjects were asked to view a landscape with red and green colors through this lens in the open air on a sunny day. Compared to the case when viewed with the naked eyes, a case in which all of the test subjects evaluated that the contrast between red and green increased and the landscape was clearly visible, was rated as A; a case in which 3 or more test subjects evaluated that the contrast between red and green increased and the landscape was clearly visible, was rated as B; a case in which one or two test subjects evaluated that the contrast between red and green increased and the landscape was clearly visible, was rated as C; and a case in which there was no test subject who evaluated that the contrast of red and green increased and the landscape was clearly visible, was rated as D.

Example 1

On the forming surface of a first mold substrate made of glass for forming an object-facing surface of a lens, the curable composition 1 was injected through a 3-μm Teflon filter, and a ring-shaped spacer was placed along the outer periphery of the forming surface of the first mold substrate. The shaped polarizing film was placed on those members, and a second mold substrate made of glass was placed thereon so as to be separated apart from the polarizing film. Next, the outer edge of the first mold substrate and the outer edge of the second mold substrate were wound with a tape so as to cover the outer edges, and thereby these were fixed. The assembly was left to stand in this state at 30° C. for 14 hours, and thereby the curable composition 1 was semi-cured. Next, the curable composition 5 was injected through a 3-μm filter made of Teflon so as to fill the gap between the shaped polarizing film and the second mold substrate. This lens casting mold was placed in a hot air circulation type oven and was heated to 110° C. for 30 hours. After gradual cooling, the lens casting mold was taken out of the oven, and the tape, the first mold substrate, and the second mold substrate were removed from the lens casting mold. Thus, a semi-finished polarizing lens with a base curve of 6.0 and a center thickness of 10 mm was obtained.

Next, the eye-facing surface was cut and polished, and thereby a polarizing lens having a dioptric power of −4.0 D and a center thickness of 2.0 mm was obtained. The minimum thickness (R1-min) of the first resin substrate was 0.8 mm, the maximum thickness (R1-max) of the first resin substrate was 0.8 mm, the minimum thickness (R2-min) of the second resin substrate was 1.2 mm, and the maximum thickness (R2-max) of the second resin substrate was 6.9 mm. The evaluation results are shown in Table 1.

The resin discarded during cutting and polishing was entirely a cured product of the curable composition 5 (not containing any expensive organic colorant compound), and the loss of the expensive organic colorant compound was zero.

The contents of the organic colorant compound in the resin substrates forming the object-facing surface and the eye-facing surface as calculated from the injection amount of the curable composition and the cutting and polishing of the resin of the eye-facing surface were 0.28 mg and 0 mg, respectively.

Example 2

A semi-finished polarizing lens having a base curve of 6.0 and a center thickness of 10 mm was obtained in the same manner as in Example 1, except that curable composition 2 was used in place of curable composition 1, and curable composition 4 was used in place of curable composition 5.

Next, the eye-facing surface was cut and polished, and thereby a polarizing lens having a dioptric power of −4.0 D and a center thickness of 2.0 mm was obtained. The minimum thickness (R1-min) of the first resin substrate was 0.8 mm, the maximum thickness (R1-max) of the first resin substrate was 0.8 mm, the minimum thickness (R2-min) of the second resin substrate was 1.2 mm, and the maximum thickness (R2-max) of the second resin substrate was 6.9 mm. The evaluation results are shown in Table 1.

The resin discarded during cutting and polishing was a cured product of the curable composition 4 (in which the content of the expensive organic colorant compound was extremely low such as 2 ppm), and the loss of the expensive organic colorant compound was 0.09 mg, while the amount discarded was very small.

The contents of the organic colorant compound in the resin substrates forming the object-facing surface and the eye-facing surface as calculated in the same manner as in Example 1 were 0.11 mg and 0.02 mg, respectively.

Example 3

A semi-finished polarizing lens having a base curve 6.0 and a center thickness of 10 mm was obtained in the same manner as in Example 1, except that curable composition 4 was used instead of curable composition 1.

Next, the eye-facing surface was cut and polished, and thereby a polarizing lens having a dioptric power of −4.0 D and a center thickness of 2.0 mm was obtained. The minimum thickness (R1-min) of the first resin substrate was 0.8 mm, the maximum thickness (R1-max) of the first resin substrate was 0.8 mm, the minimum thickness (R2-min) of the second resin substrate was 1.2 mm, and the maximum thickness (R2-max) of the second resin substrate was 6.9 mm. The evaluation results are shown in Table 1.

The resin discarded during cutting and polishing was entirely a cured product of the curable composition 5 (not containing any expensive organic colorant compound), and the loss of the expensive organic colorant compound was zero.

The contents of the organic colorant compound in the resin substrates forming the object-facing surface and the eye-facing surface as calculated in the same manner as in Example 1 were 0.01 mg and 0 mg, respectively.

Example 4

[Production of Lens Containing no Organic Colorant Compound]

Curable composition 5 was injected into a mold composed of two sheets of glass molds and a plastic gasket, this was placed in a hot air circulation type oven, and the temperature was increased to 110° C. for 30 hours. After gradual cooling, the lens casting mold was taken out of the oven, and the glass mold and the plastic gasket were removed. Thus, a lens was obtained.

[Production of Polarizing Lens]

On the forming surface of a first mold substrate made of glass for forming the object-facing surface of a lens, the curable composition 3 was injected through a 3-μm Teflon filter, and a ring-shaped spacer was placed along the outer periphery of the forming surface of the first mold substrate. The shaped polarizing film was placed on those members, and the curable composition 3 was injected again on the polarizing film through a 3-μm Teflon filter. Furthermore, a lens containing no organic colorant compound produced in advance as described above was placed on the curable composition 3. Next, the outer edge of the first mold substrate and the outer edge of the white lens were wound with a tape so as to cover the outer edges, and thereby these were fixed. This lens casting mold was placed in a hot air circulation type oven and was heated to 110° C. for 30 hours. After gradual cooling, the lens casting mold was taken out of the oven, and the tape and the first mold substrate were removed from the lens casting mold. Thus, a semi-finished polarizing lens having a base curve of 6.0 and a center thickness of 10 mm was obtained.

Next, the eye-facing surface was cut and polished, and thereby a polarizing lens having a dioptric power of −4.0 D and a center thickness of 2.0 mm was obtained. The minimum thickness (R1-min) of the first resin substrate was 0.8 mm, the maximum thickness (R1-max) of the first resin substrate was 0.8 mm, the minimum thickness (R2-min) of the second resin substrate was 1.2 mm, and the maximum thickness (R2-max) of the second resin substrate was 6.9 mm. The evaluation results are shown in Table 1.

The resin discarded during cutting and polishing was entirely a cured product of the curable composition 5 (not containing any expensive organic colorant compound), and the loss of the expensive organic colorant compound was zero.

The contents of the organic colorant compound in the resin substrates forming the object-facing surface and the eye-facing surface as calculated from the injection amount of the curable composition and the cutting and polishing of the resin of the eye-facing surface were 0.06 mg and 0.06 mg, respectively.

Example 5

[Formation of Primer Layer]

A semi-finished polarizing lens having a base curve 6.0 and a center thickness of 10 mm was obtained in the same manner as in Example 1, except that curable composition 5 was used instead of curable composition 1. The semi-finished polarizing lens was washed and dried, and then the surface was degreased with acetone. Next, a moisture-curable polyurethane resin TS-SC-P (manufactured by Tokuyama Corporation) was spin-coated and dried at room temperature for 5 minutes.

[Preparation of Organic Colorant Compound-Containing Resin]

To 100 parts by weight of a UV-curable urethane acrylate resin, UNIDIC V-4001EA (manufactured by DIC Corporation), 3 parts by weight of Irgacure 184 (manufactured by BASF SE) as a photopolymerization initiator, 0.6 parts by weight of a leveling agent, L7001 (manufactured by Dow Corning Toray Co., Ltd.), and 0.35 parts by weight of an organic colorant compound, PD-311S (manufactured by Yamamoto Chemicals, Inc.), were added, the mixture was stirred and mixed. Thus, an organic colorant compound-containing resin was obtained.

[Formation of Organic Colorant Compound Resin Film and Production of Polarizing Lens]

Next, about 2 g of the organic colorant compound-containing resin prepared as described above was spin-coated using a spin coater on the object-facing surface of the semi-finished polarizing lens that had been dried previously, and thus a coating film of the organic colorant compound resin was formed.

Next, the semi-finished polarizing lens having the object-facing surface coated with a coating film of the organic colorant compound resin was irradiated with UV light using a metal halide lamp, and thereby the coating film was cured. Subsequently, a heat treatment was further performed at 100° C. for 1 hour, and a semi-finished polarizing lens having an organic colorant compound-containing resin film stacked over the object-facing surface was obtained. The film thickness was 40 μm.

Next, the eye-facing surface was cut and polished, and thereby a polarizing lens having a dioptric power of −4.0 D and a center thickness of 2.0 mm was obtained. The minimum thickness (R1-min) of the first resin substrate was 0.8 mm, the maximum thickness (R1-max) of the first resin substrate was 0.8 mm, the minimum thickness (R2-min) of the second resin substrate was 1.2 mm, and the maximum thickness (R2-max) of the second resin substrate was 6.9 mm. The evaluation results are shown in Table 1.

The resin discarded during cutting and polishing was entirely a cured product of the curable composition 5 (not containing any expensive organic colorant compound), and the loss of the expensive organic colorant compound was zero.

The content of the organic colorant compound in the resin substrate forming the eye-facing surface as calculated in the same manner as in Example 1 was 0 mg. The content of the organic colorant compound in the coat layer formed on the object-facing surface side was 7 mg.

Comparative Example 1

A semi-finished polarizing lens having a base curve of 6.0 and a center thickness of 10 mm was obtained in the same manner as in Example 1, except that curable composition 5 was used in place of curable composition 1, and curable composition 1 was used in place of curable composition 5.

Next, the eye-facing surface was cut and polished, and thereby a polarizing lens having a dioptric power of −4.0 D and a center thickness of 2.0 mm was obtained. The minimum thickness (R1-min) of the first resin substrate was 0.8 mm, the maximum thickness (R1-max) of the first resin substrate was 0.8 mm, the minimum thickness (R2-min) of the second resin substrate was 1.2 mm, and the maximum thickness (R2-max) of the second resin substrate was 6.9 mm. The evaluation results are shown in Table 1.

The resin discarded during cutting and polishing was a cured product of the curable composition 1 (containing 50 ppm of the expensive organic colorant compound), and the loss of the expensive organic colorant compound was 2.28 mg, while the amount discarded was large (about 25 times the amount of Example 2).

The contents of the organic colorant compound in the resin substrates forming the object-facing surface and the eye-facing surface as calculated in the same manner as in Example 1 were 0 mg and 0.57 mg, respectively.

Comparative Example 2

A semi-finished polarizing lens having a base curve of 6.0 and a center thickness of 10 mm was obtained in the same manner as in Example 1, except that curable composition 2 was used in place of curable composition 1, and curable composition 2 was used in place of curable composition 5.

Next, the eye-facing surface was cut and polished, and thereby a polarizing lens having a dioptric power of −4.0 D and a center thickness of 2.0 mm was obtained. The minimum thickness (R1-min) of the first resin substrate was 0.8 mm, the maximum thickness (R1-max) of the first resin substrate was 0.8 mm, the minimum thickness (R2-min) of the second resin substrate was 1.2 mm, and the maximum thickness (R2-max) of the second resin substrate was 6.9 mm. The evaluation results are shown in Table 1.

The resin discarded during cutting and polishing was a cured product of the curable composition 2 (containing 20 ppm of the expensive organic colorant compound), and the loss of the expensive organic colorant compound was 0.9 mg, while the amount discarded was large (about 10 times the amount of Example 2).

The contents of the organic colorant compound in the resin substrates forming the object-facing surface and the eye-facing surface as calculated in the same manner as in Example 1 were 0.11 mg and 0.2 mg, respectively.

Comparative Example 3

A semi-finished polarizing lens having a base curve of 6.0 and a center thickness of 10 mm was obtained in the same manner as in Example 1, except that curable composition 6 was used in place of curable composition 1, and curable composition 6 was used in place of curable composition 5.

Next, the eye-facing surface was cut and polished, and thereby a polarizing lens having a dioptric power of −4.0 D and a center thickness of 2.0 mm was obtained. The minimum thickness (R1-min) of the first resin substrate was 0.8 mm, the maximum thickness (R1-max) of the first resin substrate was 0.8 mm, the minimum thickness (R2-min) of the second resin substrate was 1.2 mm, and the maximum thickness (R2-max) of the second resin substrate was 6.9 mm. The evaluation results are shown in Table 1.

The resin discarded during cutting and polishing was a cured product of the curable composition 6 (containing 30 ppm of the expensive organic colorant compound), and the loss of the expensive organic colorant compound was 1.35 mg, while the amount discarded was large (about 15 times the amount of Example 2).

The contents of the organic colorant compound in the resin substrates forming the object-facing surface and the eye-facing surface as calculated in the same manner as in Example 1 were 0.17 mg and 0.32 mg, respectively.

This patent application claims priority on the basis of Japanese Patent Application No. 2018-071183 filed on Apr. 2, 2018, the entire disclosure of which is incorporated herein by reference.

The invention claimed is:

1. A plastic polarizing lens comprising:
a polarizing film comprised of polyvinyl alcohol;
a first resin substrate composed of at least one layer directly laminated on a surface of the polarizing film which is located on an object-facing surface side; and
a second resin substrate composed of at least one layer directly laminated on a surface of the polarizing film which is located on an eye-facing surface side,
wherein an organic colorant compound is included in at least one layer constituting the first resin substrate out of the first resin substrate and the second resin substrate, and a concentration of the organic colorant compound in the first resin substrate is higher than a concentration of the organic colorant compound in the second resin substrate
wherein an amount of 2 to 50 ppm of the organic colorant compound is included in the first resin substrate and an amount of 0 to 10 ppm of the organic colorant compound is included in the second resin substrate.

2. The plastic polarizing lens according to claim 1, wherein the second resin substrate does not contain the organic colorant compound.

3. The plastic polarizing lens according to claim 1, wherein a minimum thickness (R1-min) and a maximum thickness (R1-max) of the first resin substrate, and a

TABLE 1

| | Configuration | | | | | Performance | | |
| --- | --- | --- | --- | --- | --- | --- | --- | --- |
| | ← Object-facing surface | | | Eye-facing surface → | | Color unevenness | Contrast | Discarded resin |
| Example-1 | | Curable composition-1 (50 ppm) | PVA film | Curable composition-5 (0 ppm) | | B | A | A |
| Example-2 | | Curable composition-2 (20 ppm) | PVA film | Curable composition-4 (2 ppm) | | A | A | B |
| Example-3 | | Curable composition-4 (2 ppm) | PVA film | Curable composition-5 (0 ppm) | | A | C | A |
| Example-4 | | Curable composition-3 (10 ppm) | PVA film | Curable composition-3 (10 ppm) | Curable composition-5 (0 ppm) | A | A | A |
| Example-5 | 40-μ coat layer/ primer layer (0.35%/0 ppm) | Curable composition-5 (0 ppm) | PVA film | Curable composition-5 (0 ppm) | | B | A | A |
| Comparative Example-1 | | Curable composition-5 (0 ppm) | PVA film | Curable composition-1 (50 ppm) | | D | A | D |
| Comparative Example-2 | | Curable composition-2 (20 ppm) | PVA film | Curable composition-2 (20 ppm) | | C | A | D |
| Comparative Example-3 | | Curable composition-6 (30 ppm) | PVA film | Curable composition-6 (30 ppm) | | D | A | D | minimum thickness (R2-min) and a maximum thickness (R2-max) of the second resin substrate satisfy the following Expression:

Expression: R1-min/R1-max>R2-min/R2-max.

4. The plastic polarizing lens according to claim 3, wherein the first resin substrate has a substantially uniform thickness.

5. The plastic polarizing lens according to claim 3, wherein the minimum thickness (R1-min) of the first resin substrate is smaller than the minimum thickness (R2-min) of the second resin substrate.

6. The plastic polarizing lens according to claim 3, wherein the minimum thickness (R1-min) and the maximum thickness (R1-max) of the first resin substrate are 0.1 mm to 4.0 mm, and the minimum thickness (R2-min) and the maximum thickness (R2-max) of the second resin substrate are 0.1 mm to 17.0 mm.

7. The plastic polarizing lens according to claim 1, wherein in a case in which the organic colorant compound is included in the first resin substrate and the second resin substrate, a ratio (b/a) of a content b of the organic colorant compound in the first resin substrate to a content a of the organic colorant compound in the second resin substrate is 2/1 to 100/1.

8. The plastic polarizing lens according to claim 1, wherein the organic colorant compound is a tetraazaporphyrin compound represented by the following General Formula (1):

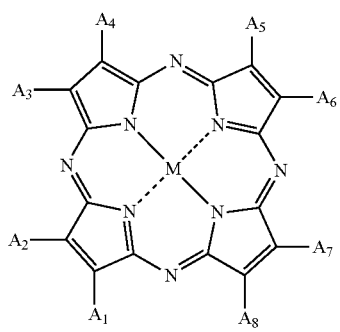

(1)

wherein in Formula (1), $A_1$ to $A_S$ each independently represent a hydrogen atom, a halogen atom, a nitro group, a cyano group, a hydroxy group, an amino group, a carboxyl group, a sulfonic acid group, a linear, branched, or cyclic alkyl group having 1 to 20 carbon atoms, an alkoxy group having 1 to 20 carbon atoms, an aryloxy group having 6 to 20 carbon atoms, a monoalkylamino group having 1 to 20 carbon atoms, a dialkylamino group having 2 to 20 carbon atoms, a dialkylamino group having 7 to 20 carbon atoms, an aralkyl group having 7 to 20 carbon atoms, an aryl group having 6 to 20 carbon atoms, a heteroaryl group, an alkylthio group having 6 to 20 carbon atoms, or an arylthio group having 6 to 20 carbon atoms, and $A_1$ to $A_S$ may form a ring except for an aromatic ring via a linking group; and M represents two hydrogen atoms, a divalent metal atom, a divalent monosubstituted metal atom, a tetravalent disubstituted metal atom, or an oxy metal atom.

9. The plastic polarizing lens according to claim 1, wherein layers constituting the first resin substrate and the second resin substrate, which may be identical or different, is comprised of at least one kind selected from a poly(thio)urethane, a polysulfide, a polycarbonate, a poly(meth)acrylate, and a polyolefin.

10. The plastic polarizing lens according to claim 9, wherein at least one layer constituting the first resin substrate and the second resin substrate is comprised of a poly(thio)urethane.

11. A method for manufacturing a plastic polarizing lens, comprising:
preparing a first resin substrate containing an organic colorant compound;
preparing a second resin substrate that optionally contain an organic colorant compound at a concentration lower than that of the first resin substrate and an amount of 2 to 50 ppm of the organic colorant compound is included in the first resin substrate and an amount of 0 to 10 ppm of the organic colorant compound is included in the second resin substrate; and
directly laminating the first resin substrate to a surface located on an object-facing surface side of a polarizing film comprised of polyvinyl alcohol, and also directly laminating the second resin substrate to a surface located on an eye-facing surface side of the polarizing film.

12. The method for manufacturing a plastic polarizing lens according to claim 11, wherein layers constituting the first resin substrate and the second resin substrate may be identical or different and are comprised of a resin selected from the group consisting of a poly(thio)urethane, a polysulfide, a polycarbonate, a poly(meth)acrylate, and a polyolefin.

13. The method for manufacturing a plastic polarizing lens according to claim 11, wherein the second resin substrate or the second curable composition does not contain the organic colorant compound.

14. The method for manufacturing a plastic polarizing lens according to claim 11, wherein the organic colorant compound is a tetraazaporphyrin compound represented by the following General Formula (1):

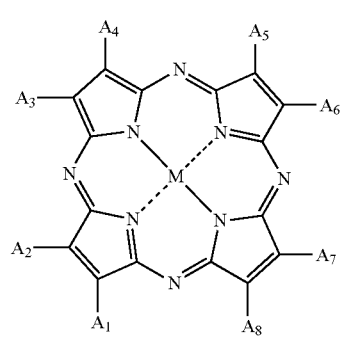

(1)

wherein in Formula (1), $A_1$ to $A_S$ each independently represent a hydrogen atom, a halogen atom, a nitro group, a cyano group, a hydroxy group, an amino group, a carboxyl group, a sulfonic acid group, a linear, branched, or cyclic alkyl group having 1 to 20 carbon atoms, an alkoxy group having 1 to 20 carbon atoms, an aryloxy group having 6 to 20 carbon atoms, a monoalkylamino group having 1 to 20 carbon atoms, a dialkylamino group having 2 to 20 carbon atoms, a dialkylamino group having 7 to 20 carbon atoms, an aralkyl group having 7 to 20 carbon atoms, an aryl group having 6 to 20 carbon atoms, a heteroaryl group, an alkylthio group having 6 to 20 carbon atoms, or an arylthio group having 6 to 20 carbon atoms, and $A_1$ to $A_8$ may form a ring except for an aromatic ring via a linking group; and M represents two hydrogen atoms, a divalent metal atom, a divalent monosubstituted metal atom, a tetravalent disubstituted metal atom, or an oxy metal atom.

15. The method for manufacturing a plastic polarizing lens according to claim 11,
wherein in a case in which the organic colorant compound is included in the first resin substrate and the second resin substrate, a ratio (b/a) of a content b of the organic colorant compound in the first resin substrate to a content a of the organic colorant compound in the second resin substrate is 2/1 to 100/1.

16. A method for manufacturing a plastic polarizing lens, the method comprising:
separating between a first mold substrate having a forming surface for forming an object-facing surface of a lens and a polarizing film comprised of polyvinyl alcohol at a predetermined distance, such that the forming surface and the polarizing film are separated by a first curable composition layer containing an organic colorant compound;
fixing an outer edge of the first mold substrate, an outer edge of the polarizing film, and an outer edge of a second mold substrate having a forming surface for forming an eye-facing surface of the lens, by covering these outer edges with a fixing member, and disposing the second mold substrate so as to face the polarizing film while being separated apart from the polarizing film at a predetermined distance;
injecting a second curable composition that optionally contain an organic colorant compound at a concentration lower than that of a first curable composition, into a gap between the polarizing film and the second mold substrate and an amount of 2 to 50 ppm of the organic colorant compound is included in the first curable composition and an amount of 0 to 10 ppm of the organic colorant compound is included in the second curable composition;
curing the first curable composition layer and the injected second curable composition, thereby forming a first resin substrate and a second resin substrate over both surfaces of the polarizing film;
removing the fixing member, the first mold substrate, and the second mold substrate, and then taking out a plastic lens.

17. A method for manufacturing a plastic polarizing lens, the method comprising:
separating between a first mold substrate having a forming surface for forming an object-facing surface of a lens and a polarizing film comprised of polyvinyl alcohol at a predetermined distance, such that the forming surface and the polarizing film are separated by a first curable composition layer containing an organic colorant compound;
covering an outer edge of the first mold substrate, an outer edge of the polarizing film, and an outer edge of a second mold substrate having a forming surface for forming an eye-facing surface of the lens, with a fixing member, and thereby disposing the second mold substrate so as to face the polarizing film while being separated apart from the polarizing film at a predetermined distance;
semi-curing the first curable composition layer;
injecting a second curable composition that optionally contain an organic colorant compound at a concentration lower than that of the first curable composition, into a gap between the polarizing film and the second mold substrate and an amount of 2 to 50 ppm of the organic colorant compound is included in the first curable composition and an amount of 0 to 10 ppm of the organic colorant compound is included in the second curable composition;
curing the semi-cured first curable composition layer and the injected second curable composition, thereby forming a first resin substrate and a second resin substrate over both surfaces of the polarizing film;
removing the fixing member, the first mold substrate, and the second mold substrate, and then taking out a plastic lens.

18. The method for manufacturing a plastic polarizing lens according to claim 17,
wherein in the step of semi-curing the first curable composition layer, the first curable composition layer is semi-cured such that the position of the polarizing film is in a state of being immovable at a position separated 0.1 to 3.0 mm apart from the forming surface of the first mold substrate.

19. A method for manufacturing a plastic polarizing lens, the method comprising:
separating between a first mold substrate having a forming surface for forming an object-facing surface of a lens and a polarizing film at a predetermined distance, such that the forming surface and the polarizing film are separated by a first curable composition layer containing an organic colorant compound having a viscosity of 1,000 to 100,000 mPa's;
fixing an outer edge of the first mold substrate, an outer edge of the polarizing film comprised of polyvinyl alcohol, and an outer edge of a second mold substrate having a forming surface for forming an eye-facing surface of the lens, by covering these outer edges with a fixing member, and disposing the second mold substrate so as to face the polarizing film while being separated apart from the polarizing film at a predetermined distance;
injecting a second curable composition that optionally contain an organic colorant compound at a concentration lower than that of the first curable composition, into a gap between the polarizing film and the second mold substrate and an amount of 2 to 50 ppm of the organic colorant compound is included in the first curable composition and an amount of 0 to 10 ppm of the organic colorant compound is included in the second curable composition;
curing the first curable composition layer and the injected second curable composition, thereby forming a first resin substrate and a second resin substrate over both surfaces of the polarizing film;
removing the fixing member, the first mold substrate, and the second mold substrate, and then taking out a plastic lens.

20. A method for manufacturing a plastic polarizing lens, the method comprising:
covering an outer edge of a first mold substrate having a forming surface for forming an object-facing surface of a lens, an outer edge of a polarizing film comprised of polyvinyl alcohol, and an outer edge of a second mold substrate having a forming surface for forming an eye-facing surface of a lens, with a fixing member, and thereby fixing the polarizing film in a state of being separated apart from the forming surface of the first mold substrate and the forming surface of the second mold substrate;

injecting a first curable composition containing an organic colorant compound into a gap between the polarizing film and the first mold substrate;

injecting a second curable composition that optionally contain an organic colorant compound at a concentration lower than that of the first curable composition, into a gap between the polarizing film and the second mold substrate and an amount of 2 to 50 ppm of the organic colorant compound is included in the first curable composition and an amount of 0 to 10 ppm of the organic colorant compound is included in the second curable composition;

polymerizing and curing the first curable composition and the second curable composition, thereby forming a first resin substrate and a second resin substrate over both surfaces of the polarizing film;

removing the fixing member, the first mold substrate, and the second mold substrate, and then taking out a plastic polarizing lens.

* * * * *